(12) United States Patent
Yong et al.

(10) Patent No.: US 7,083,291 B1
(45) Date of Patent: Aug. 1, 2006

(54) GLARE SHIELD FOR CAMERA

(76) Inventors: Peter Yong, 3426 Onyx St., Torrance, CA (US) 90503; Leo T. Rodriguez, 320 Mooney Dr., Monterey Park, CA (US) 91755

( * ) Notice: Subject to any disclaimer, the term of this patent is extended or adjusted under 35 U.S.C. 154(b) by 6 days.

(21) Appl. No.: 10/688,534

(22) Filed: Oct. 17, 2003

Related U.S. Application Data

(60) Provisional application No. 60/420,445, filed on Oct. 24, 2002.

(51) Int. Cl.
*G02B 23/16* (2006.01)

(52) U.S. Cl. ............... 359/612; 359/601; 348/834; 348/842

(58) Field of Classification Search .......... 359/612, 359/601, 609, 611, 614; 396/534, 535, 544, 396/287, 661; 361/681, 686; 358/906, 909.1; 386/117, 118; 345/905; 348/842, 333.01, 348/841, 843, 844, 834
See application file for complete search history.

(56) References Cited

U.S. PATENT DOCUMENTS

| | | | |
|---|---|---|---|
| 1,263,684 A | 4/1918 | Leach | 396/534 |
| 3,274,910 A | 9/1966 | Williams | 396/544 |
| 3,842,431 A | 10/1974 | Sakuma | 396/534 |
| 4,444,465 A * | 4/1984 | Giulie et al. | 359/601 |
| 4,576,459 A | 3/1986 | Miura et al. | 396/534 |
| 4,729,648 A | 3/1988 | Armstrong | 359/610 |
| 4,784,468 A * | 11/1988 | Tierney | 359/601 |
| 4,865,420 A | 9/1989 | Schmidt | 359/601 |
| 5,069,529 A * | 12/1991 | Takahashi | 359/601 |
| 5,095,385 A * | 3/1992 | Stroll, Jr. | 359/609 |
| 5,218,474 A | 6/1993 | Kirschner | 359/601 |
| 5,225,932 A | 7/1993 | Wannagot et al. | 359/611 |
| 5,233,468 A | 8/1993 | McNulty | 359/601 |
| 5,337,891 A | 8/1994 | Toth | 206/316.2 |
| 5,543,863 A * | 8/1996 | Lin | 348/835 |
| 5,550,606 A | 8/1996 | Jansen, Jr. et al. | 396/436 |
| 5,905,546 A | 5/1999 | Giulie et al. | 348/842 |
| D411,753 S | 6/1999 | Jobin | D99/43 |
| 5,966,241 A | 10/1999 | Gilger | 359/609 |
| D422,579 S | 4/2000 | McBride | D14/449 |
| 6,115,238 A * | 9/2000 | von Gutfeld | 361/681 |

(Continued)

FOREIGN PATENT DOCUMENTS

EP    608035 A1 *   7/1994

(Continued)

OTHER PUBLICATIONS

HoodMan LCD Sun Shade, Apr. 23, 2002, six pages.

*Primary Examiner*—Arnel C. Lavarias
(74) *Attorney, Agent, or Firm*—Charles H. Thomas

(57) ABSTRACT

A glare shield for the viewfinder of a video camera or the LCD screen of a video or digital camera is comprised of a hood that casts a shadow upon the viewfinder eyepiece or LCD screen to reduce the amount of ambient light falling upon the viewfinder eyepiece or LCD screen. The glare shield is formed of inexpensive materials and is collapsible so that it may be carried in a photographer's pocket or camera bag. It is readily attachable to and detachable from the a camcorder. The glare shield may be formed of adjustable components so that a single glare shield may be utilized on LCD screens of varying sizes. The glare shield of the invention is formed of materials that will not scratch or damage the photographer's eyeglass lenses or the structure of the camera or camcorder with which the invention is utilized.

12 Claims, 22 Drawing Sheets

U.S. PATENT DOCUMENTS

| | | | |
|---|---|---|---|
| D431,536 S | 10/2000 | Feasey | D14/449 |
| 6,144,418 A * | 11/2000 | Kappel et al. | 348/834 |
| 6,144,419 A | 11/2000 | Schmidt | 348/842 |
| 6,253,032 B1 | 6/2001 | Van Den Herik | 396/374 |
| 6,419,367 B1 * | 7/2002 | Dion et al. | 359/612 |
| 6,542,698 B1 * | 4/2003 | Izawa | 396/287 |

FOREIGN PATENT DOCUMENTS

| | | |
|---|---|---|
| JP | 61067841 A * | 4/1986 |

* cited by examiner

FIG.1  PRIORART

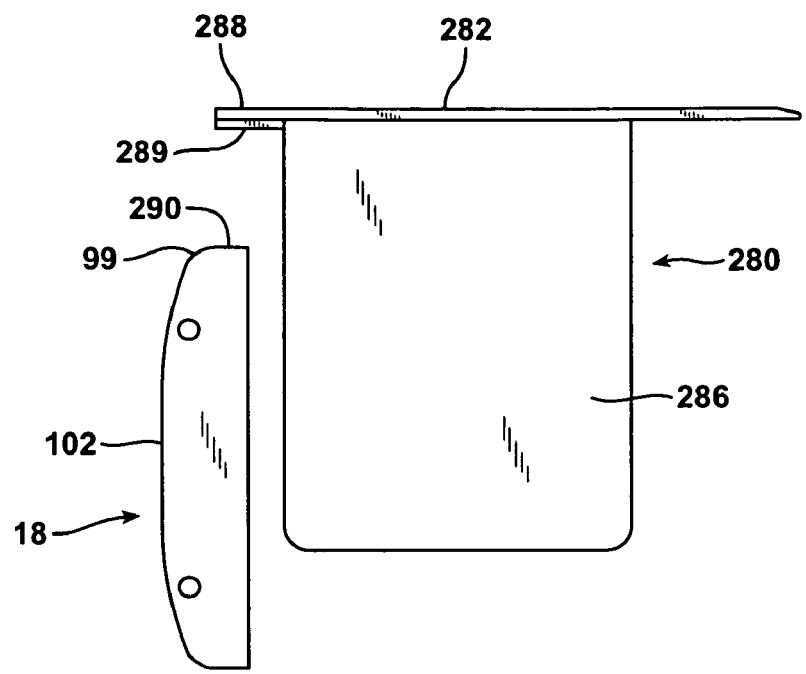
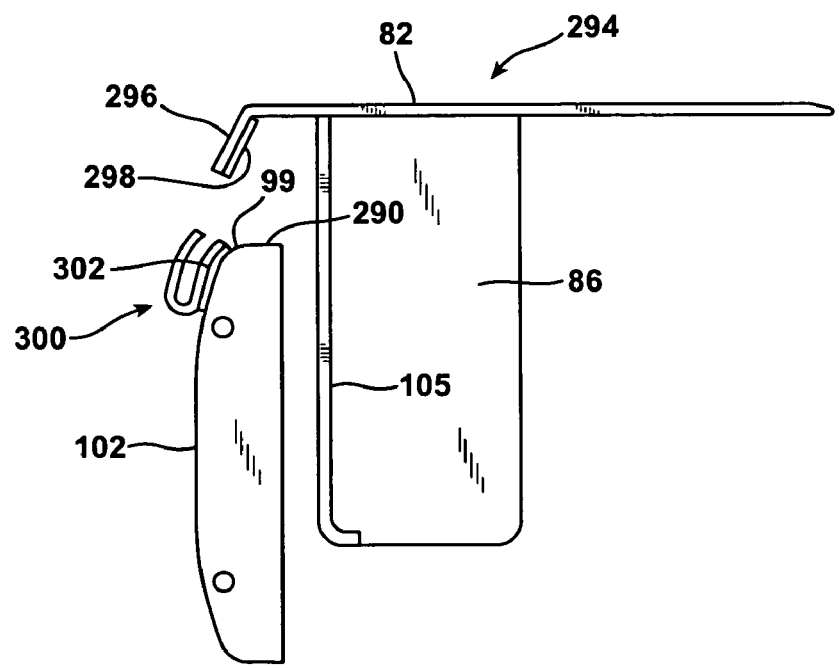

GLARE SHIELD FOR CAMERA

This application claims the benefit of the filing date of U.S. Provisional Application No. 60/420,445 filed Oct. 24, 2002.

BACKGROUND OF THE INVENTION

1. Field of the Invention

The present invention relates to a hood designed to shield a camera viewfinder or a video camera LCD screen from glare due to ambient light. The hood has particular utility for people who wear eyeglasses.

2. Description of the Prior Art

A problem has existed for many years in viewing images through the viewfinder or on an LCD screen of still picture cameras and video cameras. Specifically, it is very difficult for a person to properly aim a camera using a viewfinder or to see an image in a small camera LCD screen in high levels of ambient light. This problem is particularly bothersome to persons who wear eyeglasses, since the physical obstruction of the eyeglass lenses is a limiting factor that prevents a person from placing a viewfinder directly up against the person's eyes. As a result, a high level of ambient light is admitted into the viewfinder due to the forced distance of separation between the user's eye and the viewfinder that results from the presence of an eyeglass lens therebetween. A high level of ambient light falls upon the viewfinder lens from about the periphery of the eyeglasses, thereby obscuring the image to the viewer. The same problem exists whether or not a person wears eyeglasses, but is typically a greater problem to those persons who do wear eyeglasses.

SUMMARY OF THE INVENTION

The present invention involves a system for greatly reducing the level of ambient light that falls upon a still camera or video camera viewfinder or LCD screen, thereby minimizing the extent to which ambient light interferes with framing a picture. The present invention involves a hood which may be positioned about a camera viewfinder or LCD screen, and which extends outwardly and toward the user to form a concave cup-shaped or tent-shaped light-blocking glare shield to reduce interference in viewing through a viewfinder or LCD screen due to peripheral ambient light.

In one version of the invention the hood is comprised of a generally flat, roof-shaped canopy that extends over the top of a video camera LCD video display screen or a digital camera LCD video display screen and has depending side flaps extending perpendicular to the roof to shield the LCD screen from the sides. The rear edge of the hood, remote from the person viewing the screen, is formed with a relatively narrow mounting strip for attachment to the top or back of the structure of the camera or the frame surrounding the LCD screen frame. In some embodiments of this arrangement the flat mounting strip has slits at both the lateral inboard and outboard edges that separate the ends of the strip from the roof.

The rear mounting strip is fastened to the top edge of the LCD, bent over along a laterally extending fold at substantially right angles relative to the roof of the hood. The ends of the rear marginal mounting strip are separated from the roof by the slits to allow the rear mounting strip to conform to the slight convex curvature that exists on the rear surface of the panels of most video camera LCD screens. The inwardly facing surface of the rear marginal mounting strip has a thin fastening mechanism. One preferred fastening mechanism is formed of mating flexible hook and loop fabric fastener strips, such as those made by 3M Corporation and sold under the name Grippit by Bedford Industries located at 1659 Rowe Avenue, Worthington, Minn. 56187-0039. One of the Grippit strips is attached to the underside of the mounting strip of the hood at the rear of the roof thereof, while the other, mating Grippit strip is secured to the top or upper backside of the LCD screen frame or panel.

Light shielding hoods constructed in this manner will normally be formed of nondisposable, nonabrasive materials that will not harm the lens or the LCD screen. Such materials include, but are not limited to ethylene vinyl acetate (EVA), polyvinyl chloride (PVC), polypropylene (cross linked), or polyurethane. In a disposable version a strip of double sided adhesive tape is attached to the rear mounting strip at the rear of the roof of the hood. The upper side of the strip of tape sticks to the underside of the rear mounting strip of the hood, while the underside of the adhesive tape sticks to the top or upper edge or to the backside of the LCD screen panel.

In one variation of this arrangement the mounting strip at the rear of the hood is merely formed as an extension at the rear edge of the roof of the hood and resides in coplanar relationship with the roof of the hood. One of the hook and loop fabric fastener strips is adhesively secured to the underside of the rear mounting strip of the hood located at the rear of the roof. The fastener strip thereby makes contact with the other, mating hook and loop fastener strip that is attached to the top of the LCD screen frame and adheres thereto.

It is also possible to substitute for the hook and loop fabric fastener system of these embodiments, elastic bands, or a magnetic fastening system. In a magnetic fastening system the underside of the mounting strip is covered with a material attracted by magnetism, and a corresponding magnetic strip is positioned on the top edge or rear surface of the frame panel for the LCD screen, near the upper edge thereof. The force of magnetism thereby holds the hood in position to shield the LCD screen from ambient light, thus allowing a person to view the LCD screen more clearly.

In one disposable variation of the embodiments of the invention designed for use with an LCD screen the mounting strip of the hood at the rear of the roof is provided with a narrow thin, slick, plastic reinforcing layer adhesively attached to the underside thereof. The rear marginal reinforced strip of the hood is bent downwardly 90 degrees or less. An elongated, upwardly facing, U-shaped clip is mounted by adhesive tape on the back side of the LCD screen frame near its upper edge. The reinforced strip fits down into and is snugly engaged in the upwardly facing channel formed by the U-shaped clip to hold the hood in position shielding the LCD screen from the top and the sides.

In yet another alternative arrangement the hood is configured for use with a still camera or a video camera in which the LCD screen is located in the camera back surface and does not fold out. For such cameras the flexible fabric hook and loop fabric fastening mechanisms or other fastener of the glare shield of the invention may be attached to the top surface of the camera or to the facing structure of the camera directly above the LCD screen to hold the hood in position to shield the LCD screen from ambient light.

Another version of the invention for use with a video camera LCD screen is designed to allow one hood to fit different sizes of LCD screens, two inch, three inch, three and a half inch, or even four inch. This embodiment of the glare shield of the invention is formed with a coupling rack that receives a flat roof and a pair of side flaps or shades. The side shades are each formed with guide fingers that are received within laterally extending slots in the coupling rack to permit lateral movement of the side shades beneath the roof. The side shades have flat, horizontal portions that project toward each other beneath the underside of the roof and are secured to guides that cooperate with the coupling rack to hold the side shades in mutually parallel alignment and perpendicular to the roof and to the plane of the face of the LCD screen to shield the sides of a video or digital camera LCD screen. The side shades can be manipulated to positions closer together or further apart, to fit the image-viewing area of the LCD screen. The coupling rack is constructed to accommodate this movement.

Another embodiment of a camera-viewing screen glare shield of the present invention allows the hood of the shield to be positioned upon the foldable viewing scope terminating in an eyepiece projecting from the body of a video camera. One embodiment of the shield of the invention designed for use on a rearwardly projecting viewing scope is formed with a hood having side wings and an upwardly and forwardly projecting canopy. A square opening is defined between the side wings and below the canopy. A pair of resilient tabs define the lower edge of the opening. The tabs can be spread apart to allow the stalk-like viewing scope of the video camera to be received therewithin. A soft, rubber liner around the inside surface of the square opening conforms to the outer surface of the video camera scope to prevent ambient light from entering alongside the surface of the scope. This device, like the other embodiments, is completely detachable from the video camera.

In alternative embodiments of the invention designed for use with a rearwardly projecting video camera eyepiece scope, an area near the center of the canopy may be crossed with X-shaped slits and a downwardly projecting slit. The regions between the slits form triangular-shaped flaps that give away when the eyepiece of the camera is inserted through the aperture where the slits across each other. These flaps aid in preventing light from entering around the sides of the eyepiece since they extend back alongside the sides of the eyepiece.

In a nondisposable version of this embodiment the canopy may be formed of a relatively durable material, such as ethylene vinyl acetate (EVA), polyvinyl chloride (PVC), polypropylene (cross linked), or polyurethane. In such an embodiment the structure of the canopy has a fixed, somewhat bowl-shaped or dish-shaped configuration, concave toward the face of the person viewing the scene to be photographed through the eyepiece. Preferably, the radiating ends of the slits formed to receive the eyepiece are surrounded by a raised, surrounding foam boundary that serves not only to prevent the slits from lengthening by tearing the material of the canopy during use, but also to provide a foam, light excluding collar around the eyepiece when it is inserted through the intersection of the slits.

The eyepiece canopy of the invention may also be formed as a disposable item of a very cheap material, such as recycled, environmentally friendly black paper. In such a construction the hood is formed of a flat sheet of paper and has intersecting slits near its center. The slits cross each other to allow insertion of the video camera eyepiece through the intersection of the slits. A pair of radially inwardly directed slits are defined in the periphery of the sheet of paper forming the canopy and the side wings. These slits in the periphery extend inwardly from the perimeter a spaced distance apart. Adhesive tape is provided to allow the structure of the black paper adjacent the peripheral slits to be overlapped and secured by adhesive to form the flat, black sheet of paper into a three dimensionally, arcuately curved structure that is a curved concave forwardly toward the face of the viewer and convex rearwardly. The adhesive tape holds the adjacent edges of the structure of the canopy at the peripheral slits in overlapping contact with each other so that the hood maintains its curved configuration.

In another embodiment of the invention the glare shield has a hood formed with a tab or tongue that fits into the slot of a flash attachment mounting bracket located on the top of a still camera. This slot is usually located directly above the viewing aperture of the camera. Thus, the flash attachment slot forms a convenient way of mounting the hood to a still camera. Alternatively, the tongue may be equipped with a magnetic patch or adhesive tape to adhere to the top of the body of the camera if there is no suitable flash attachment mounting bracket.

A primary object of the invention is to provide a camera user with a portable, easily collapsible ambient light shield that may be placed about a camera viewfinder or LCD screen to preclude the interference by ambient light with viewing of the screen or viewing aperture. The ambient light shield of the invention is small, easy to use, and readily attachable to and detachable from the camera or video camera with which it is used.

The glare shield improves visibility by a photographer that would otherwise be impaired due to the presence of ambient light. The glare shield of the invention is particularly useful to people who wear eyeglasses, since the use of eyeglasses in viewing a subject necessarily requires a gap between the eye of the photographer and a camera or video viewfinder due to the presence of the eyeglass lenses on the face of the viewer.

Another object of the invention is to provide a portable glare shield for a camera or LCD viewing screen that will adapt to different sizes and shapes of camera viewfinders or LCD screens. By way of example, LCD screens are typically provided on video cameras in two, two and a half, three, three and a half, and even four-inch sizes. A preferred embodiment of the invention may be utilized to properly shield light from all of these conventional sizes of LCD screens. This is possible by providing the shield with adjustable side flaps or shades that may be moved closer together or farther apart relative to the roof panel so as to increase or reduce the shielded area.

A further object of the invention is to provide a portable sunshield that may be easily attached to and detached from a still camera or video camera without the requirement for any tools whatsoever. Various shapes and configurations of the glare shield of the invention may be provided to accommodate a wide variety of camera shapes and configurations.

A further object of the invention is to provide a camera or LCD glare shield that may be easily collapsed for transportation and storage, but just as easily deployed for use. The glare shield of the invention may be flattened compactly into a small packet that can be easily carried in a user's pocket or camera bag. Consequently, the user is not burdened with some bulky or awkward structure that cannot be easily stored or which is difficult to deploy for use.

A further object of the invention is to provide an ambient glare shield for a camera or LCD screen which may be manufactured very economically so that the use of the glare shield does not involve any significant expense. Glare shields according to the present invention may be fabricated from readily available, very inexpensive materials.

A further object of the invention is to provide a glare shield for a camera viewfinder or LCD screen that will not mar the finish of the camera to, which it is attached. A variety of different connection systems are possible, but in all embodiments the construction of the glare shield is such that scratching or detachment of adhesive from the glare shield to the camera is totally avoided.

A further object of the invention is to provide a glare shield which may be constructed in either a disposable or reusable form. The disposable versions of the glare shield of the invention are preferably constructed of stiff, recycled (environmentally friendly) black paper. The reusable versions are preferably constructed of ethylene vinyl acetate (EVA), polyvinyl chloride (PVC), polypropylene (cross linked), polyurethane, or some other basically foam plastic material that will not mar or damage the LCD screen, the lens, or the camera body.

The invention may be described with greater clarity and particularity by reference to the accompanying drawings.

DESCRIPTION OF THE DRAWINGS

FIG. 13A is a side elevational detail showing the embodiment of FIG. 12A positioned for mounting upon an LCD screen.

FIG. 13B is a side elevational detail showing a variation of the embodiment of FIG. 12A positioned for mounting upon an LCD screen.

DESCRIPTION OF THE EMBODIMENTS

Figure 1:
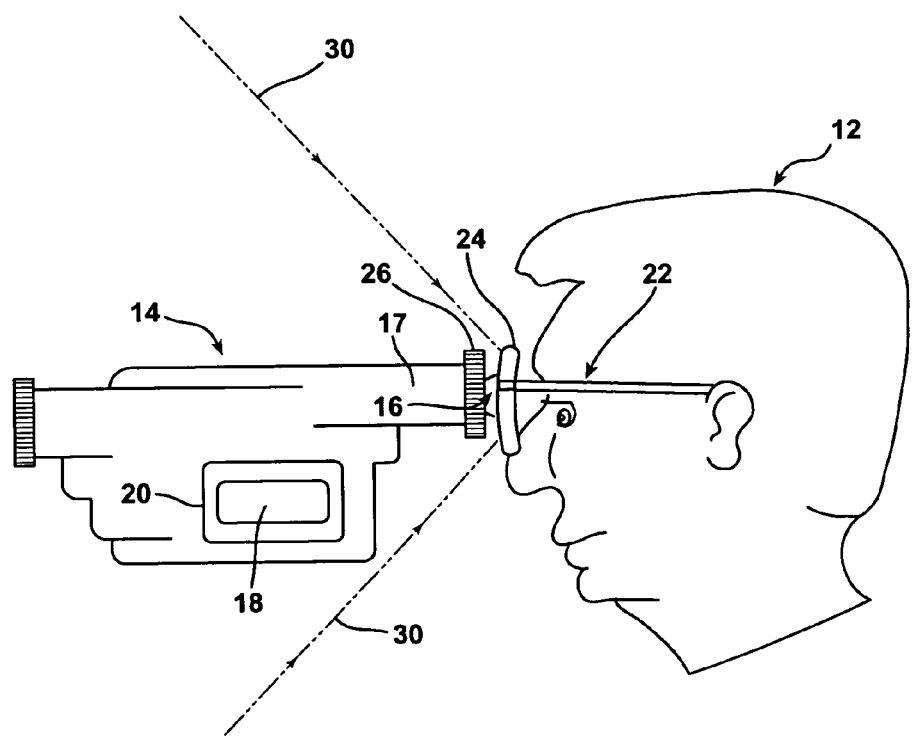
FIG. 1 is a side elevational diagram of a prior art system that illustrates the manner in which ambient light interferes with the vision of a person wearing glasses attempting to aim a video camera at a subject.

FIG. 1 illustrates a user indicated at 12 attempting to frame a scene to be recorded using a conventional home video camcorder 14. The video camera 14 has a conventional viewfinder eyepiece 16 which is mounted on a viewfinder scope arm 17 that is rotatable in a vertical plane along the axis of alignment of the viewfinder eyepiece 16. The arm 17 is typically fabricated generally in the shape of an elongated rectangular prism. The video camera 14 also has a conventional LCD viewing panel 18 that is hinged at 20 for rotation about a vertical axis so as to fold out away from the body of the video camera 14.

As illustrated in FIG. 1, the user 12 is wearing eyeglasses 22 having lenses 24 that are located a short distance in front of the user's eyes. The distance of separation of the eyeglass lenses 24 from the user's eyes is typically between about one-half and three-quarters of an inch. The lenses 24 represent an obstruction to the viewfinder eyepiece 16 so that the soft rubber eyecup 26 of the viewfinder eyepiece 16 can be pressed no closer to the user's face than the outer surface of one of the lenses 24. As a consequence, a certain amount of ambient light is reflected from the peripheral part of the eyeglasses resulting in a disturbing glare that interferes with the user's view of the article or scene to be photographed through the viewfinder eyepiece 16. These ambient rays which are reflected are indicated at 30. Also, additional ambient light enters the viewfinder eyepiece 16 directly from behind the head of the user 12 due to the distance of separation necessary between the user's eye and the eyecup 26.

All of the direct and reflected ambient light creates a glare that makes it very difficult for the user 12 to properly frame an object or scene through the viewfinder eyepiece 16. In the prior art system depicted in FIG. 1 there is no real solution to this problem. The eyecup 26, which is designed to preclude ambient light when pressed directly against the user's eye socket, simply does not function satisfactorily when pressed against the outer surface of a lens 24 of the user's eyeglasses 22.

Figure 2:
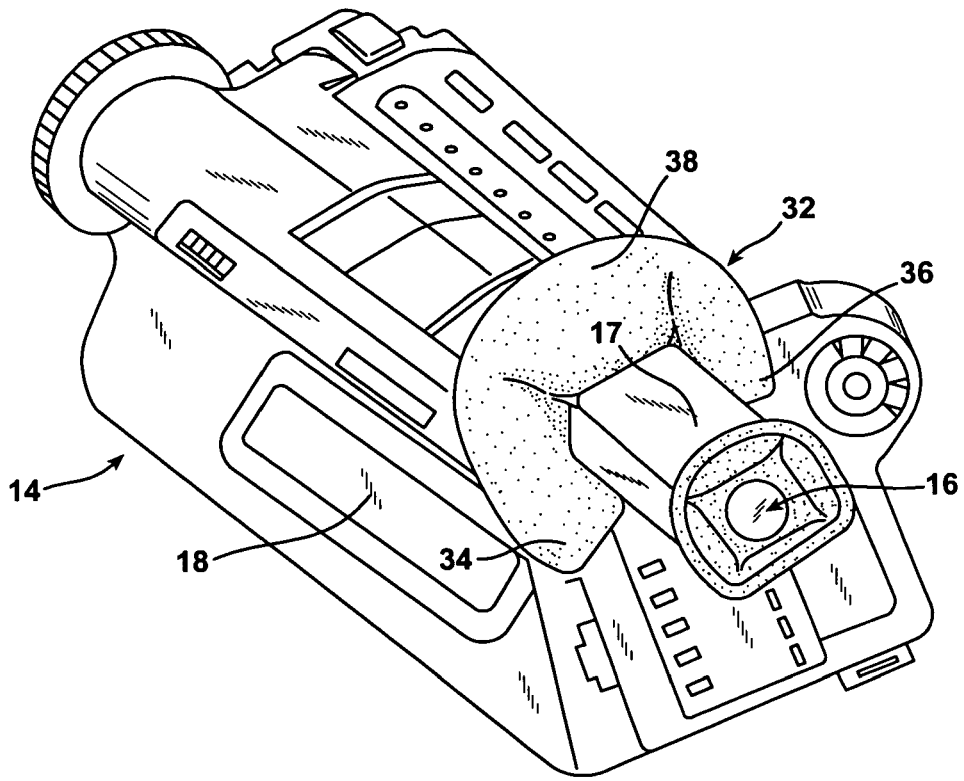
FIG. 2 is a perspective view illustrating one embodiment of the glare shield of the invention mounted on the viewfinder of a video camera.
Figure 3:
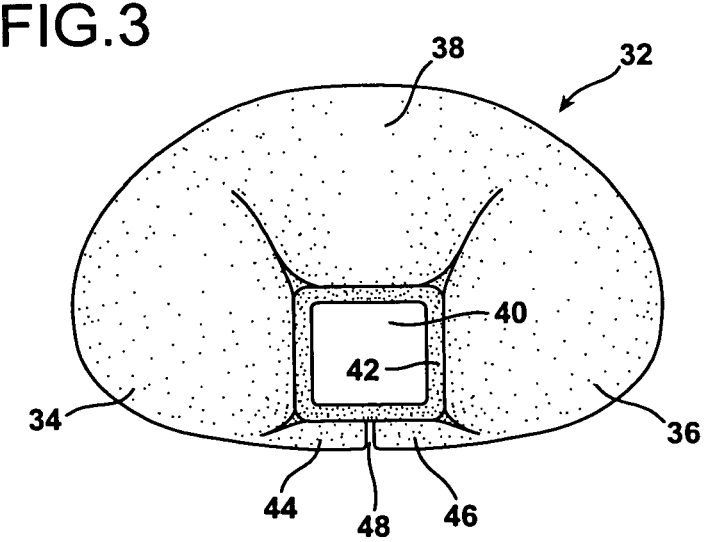
FIG. 3 is a front elevational view of the viewfinder glare shield illustrated in FIG. 2.

FIG. 2 illustrates at 32 one embodiment of a glare shield for a video camera viewfinder eyepiece 16 according to the present invention. As illustrated in FIGS. 2 and 3, the glare shield 32 has laterally projecting wings 34 and 36 that extend from the sides of the video camera viewfinder eyepiece 16, and also a shade canopy 38 that extends upwardly from the top of the viewfinder eyepiece 16 and forwardly toward the user. The wings 34 and 36 and the shade canopy 38 are all formed as parts of a uniform glare shield structure which may be fabricated as a disposable item of a stiff sheet of paper, or of a thin sheet of opaque plastic, or of some other thin, inexpensive opaque material that will hold its shape. The glare shield 32 may also be fabricated as a reusable item if constructed of a more durable material, such as ethylene vinyl acetate polypropylene (cross-linked).

Figure 4:
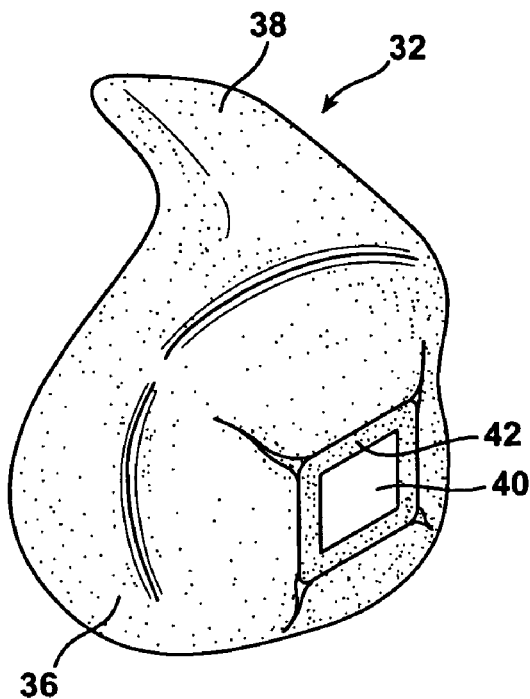
FIG. 4 is a rear, right-side perspective view of the glare shield shown in FIG. 3.

As illustrated in FIGS. 3 and 4, the wings 34 and 36 and the upwardly and forwardly projecting shade canopy 38 are configured to form a three dimensionally curved structure shaped concave forwardly toward the face of the user 12, and convex rearwardly in the opposite direction. The glare shield 32 is preferably black in color, so as to maximize light absorption.

As illustrated in FIGS. 3 and 4, the glare shield or hood 32 is formed with an aperture 40 defined therewithin beneath the shade canopy 38 and between the wings 34 and 36. The aperture 40 has a generally square cross section so as to conform to the outer shape of the arm 17 carrying the viewfinder eyepiece 16.

The glare shield 32 is formed with a pair of retaining fingers 44 and 46 that are located near the lower edge of the glare shield 32 and which do not quite meet, but form an expansion slit 48 therebetween. The fingers 44 and 46 are resiliently deflectable so that the glare shield 32 may be attached to the longitudinally extending arm 17 for the viewfinder eyepiece 16 by bending the fingers 44 and 46 out of the way to provide clear access to the bottom of the aperture 40. The glare shield 32 is then moved downwardly onto the arm 17 for the viewfinder eyepiece 16 until the arm 17 and the aperture 40 are in substantial coaxial alignment. The resilient fingers 44 and 46 are then released, whereupon they return to the positions illustrated in FIG. 3 beneath and in contact with the underside of the arm 17 for the viewfinder eyepiece 16.

The sides of the aperture 40 are preferably lined with a soft, web-like rubber or foam trim liner 42 that extends about the inside perimeter of the aperture 40. The ends of the soft foam rubber liner 42 terminate at the access slit 48. The liner 42 serves to aid in conforming the shape of the aperture 40 to the particular outer cross-sectional surface configuration of viewfinder arms 17 of different models of camcorders 14.

Preferably, the glare shield 32 is between about four and five inches in width as measured in the planar projection illustration in FIG. 3 from the peripheral extremities of the wings 34 and 36, and between about three and four inches in height as measured from the bottom of the slit 48 at the undersides of the fingers 44 and 46 to the uppermost extremity of the shade canopy 38. Preferably, the concave configuration in which the glare shield 32 is formed produces a longitudinal separation of the liner 42 from the outside perimeter of the glare shield 32, as measured about the outer extremities of the wings 34 and 36 and the shade 38, of between about one-half inch and one inch, measured longitudinally along the axis of the video camera viewfinder arm 17, as viewed in FIG. 5. If desired, the outer periphery of the glare shield 32 may be provided with a narrow band of trim for aesthetic reasons. The trim may be colored silver or some other color to match the color of the video camera 14.

Figure 5:
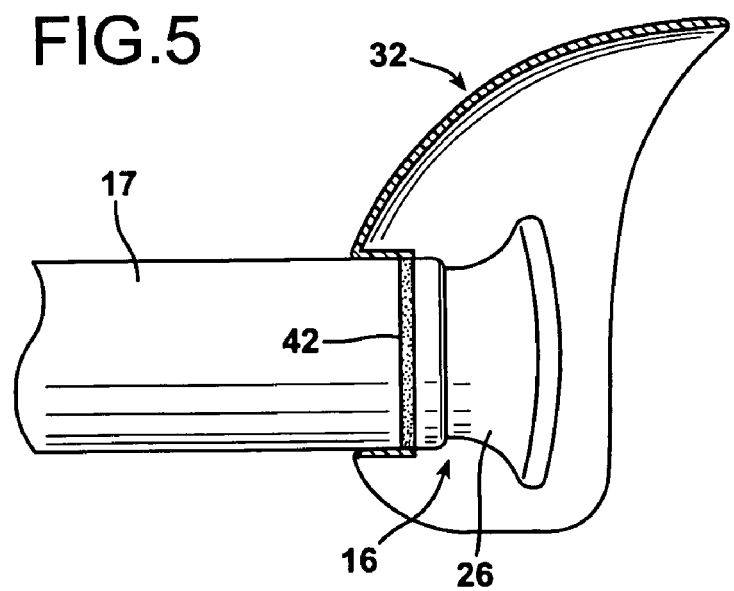
FIG. 5 is a side sectional view illustrating the manner of attachment of the glare shield of FIG. 3 to a video camera viewfinder.

The glare shield 32 is removably attachable for use with the viewfinder eyepiece 16 at any position along the length of the viewfinder arm 17 chosen by the user 12. Typically, however, the position of choice will be as illustrated in FIG. 5 in which the liner 42 about the inner perimeter of the aperture 40 resides in abutment against the back side of the base of the eyecup 26. With the glare shield 32 in this position the concave configuration of the side of the glare shield 32 facing the user created by the wings 34 and 36 and the shade canopy 38 causes at least portions of the peripheral edges of the wings 34 and 36 and the shade canopy 38 to touch or nearly touch the forehead, temple, and cheek area of the user 12, surrounding the eye which the user is using to frame a scene through the viewfinder eyepiece 16. Consequently, the glare shield 32 excludes a great deal of ambient light from the viewfinder eyepiece 16. This aids the user 12 considerably in the ability to frame a scene or object looking through the video camera viewfinder eyepiece 16.

The glare shield 32 is formed of a soft material, such as soft rubber, plastic or foam, that does not scratch the lenses 24 of the user's eyeglasses 22. The glare shield 32 may have a soft, velvet texture. The liner 42 is preferably formed of a resilient material which aids in conforming the size of the aperture 40 to the outer cross-sectional shape of the viewfinder arm 17. This allows the glare shield 32 to be utilized with most, if not all, sizes and shapes of viewfinder arms 17 in use on different video cameras 14 that are sold commercially to any significant extent. Also, the resilient nature of the liner 42 aids in frictionally engaging the glare shield 32 with the surface of the viewfinder arm 17, so that it will remain in position and will not slip in rotation or move longitudinally relative to the viewfinder eyepiece 16. The glare shield 32 does not require removal of eyeglasses for its use and is quite economical to manufacture. It is also easily attachable to and detachable from the viewfinder arm 17.

Figure 3A:
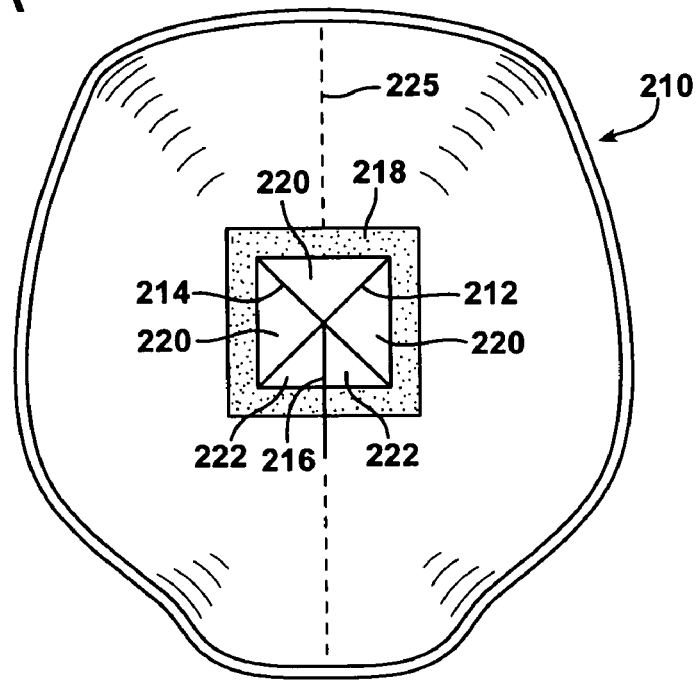
FIG. 3A is a front elevational view of one alternative embodiment of the viewfinder glare shield to that illustrated in FIG. 3.

Other embodiments of the glare shield for a viewfinder eyepiece 16 can be constructed in which the aperture formed to receive the viewfinder eyepiece 16 is completely laterally enclosed within the surrounding structure of the glare shield. For example, FIG. 3A illustrates a glare shield 210 shaped generally in the configuration of the glare shield 32, but constructed somewhat differently. Specifically, the glare shield 210 is also formed of a relatively durable, reusable material, such as ethylene vinyl acetate polypropylene (cross linked). The structure of the glare shield 210 is formed with a concave surface facing the eye of the user. The peripheral portion of the glare shield 210 is unbroken, but there is an aperture defined near the center of the structure by a pair of diagonally aligned slits 212 and 214 which intersect each other at right angles, and a vertical slit 216 that emanates from the intersection of the slits 212 and 214 and which is oriented at a forty-five degree angle relative thereto. A raised, square foam border 218 encompasses the slits 212 and 214 within its confines so as to prevent the slits 212 and 214 from being lengthened by tearing the structure of the glare shield 210 during use of the glare shield 210. The slit 216 passes through the border 218, however, so as to provide sufficient flexure to the structure of the glare shield 210 to allow the camera viewfinder eyepiece 16 to be inserted into the opening formed by the interior slits 212, 214, and 216.

To utilize the glare shield 210 the user aligns the location of the intersection of the slits 212 and 214 on the convex surface of the glare shield 210 with the viewfinder eyepiece 16 and presses the glare shield 210 longitudinally onto the camcorder viewfinder eyepiece 16. The triangular-shaped flaps 220 and 222 defined within the structure of the glare shield 210 fold back longitudinally to admit the eyepiece 16 and to allow the glare shield 210 to slide a short distance along the camcorder viewfinder arm 17. The foam border 218 spreads slightly where the slit 216 crosses it to admit the eyepiece 16.

Figure 5A:
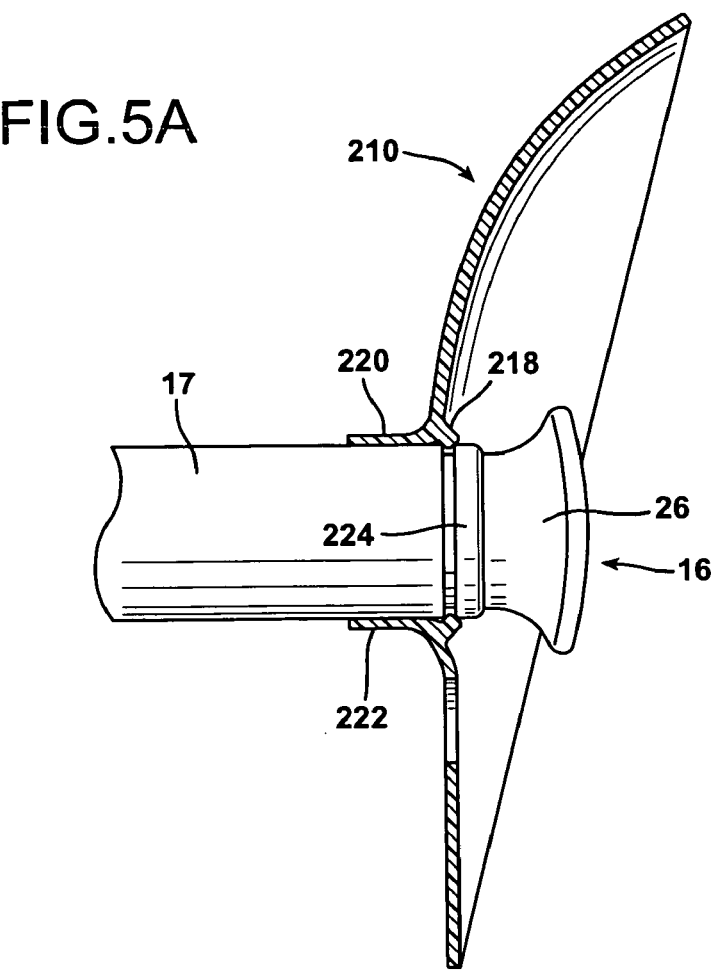
FIG. 5A is a side sectional view illustrating the manner of attachment of the glare shield of FIG. 3A to a video camera viewfinder.

Once the glare shield 210 has been pushed onto the camcorder viewfinder arm 17 about an inch along its length from the eyepiece 16, it is moved in the opposite direction back along the camcorder viewfinder eyepiece 16 and toward the rear of the eyepiece cup 26. The triangular flaps 220 and 222 reverse their longitudinal orientation as the glare shield 210 is pulled toward the back side of the eyepiece 26, as illustrated in FIG. 5A. Once the foam border 218 reaches abutment against the rear collar 224 of the eyepiece cup 26 the glare shield 210 is in a position where it will protect the eyepiece 16 from a great deal of ambient glare. The foam border 218 and the contact of the flexible flaps 220 and 222 with the sides of the camcorder viewfinder arm 17 serve to minimize the amount of light that enters the central aperture of the glare shield 210 alongside the camcorder viewfinder eyepiece 16.

Preferably, the glare shield 210 is fabricated with a vertical score line 225 that bifurcates the structure of the glare shield 210. The score line 225 allows the glare shield 210 to be folded in half for easy storage when it is not in use.

Figure 3B:
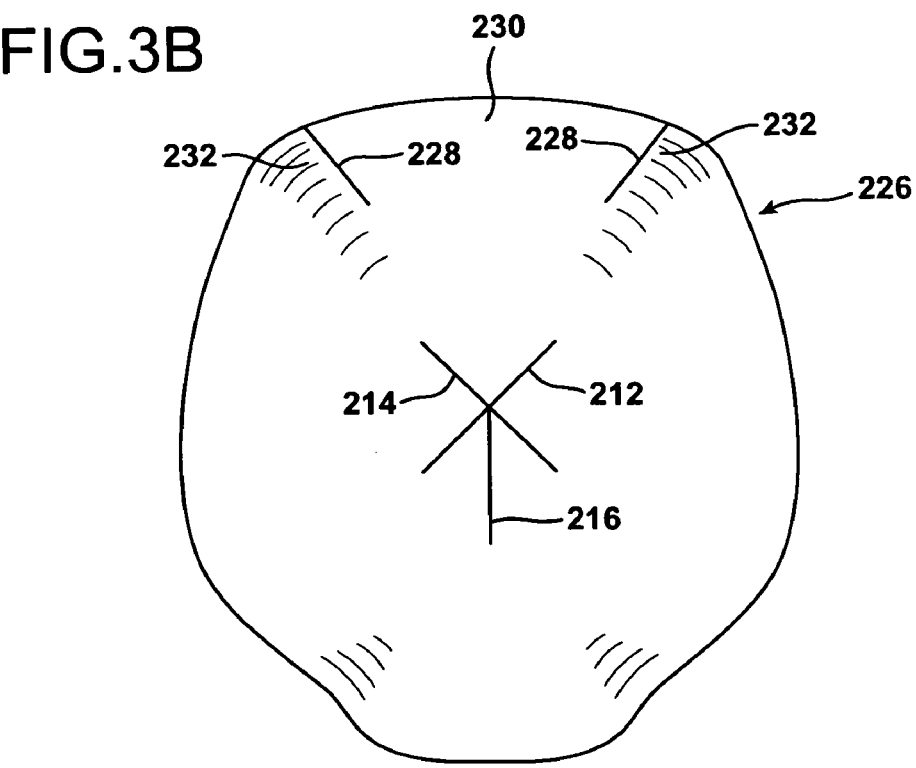
FIG. 3B is a front elevational view of another alternative embodiment of the viewfinder glare shield to that illustrated in FIG. 3.

FIG. 3B illustrates another embodiment of a glare shield which is disposable in nature. The glare shield 226 may be formed of flat sheet stock such as black paper having a twenty-four pound weight or greater and which is illustrated in a flattened condition in FIG. 3B. The glare shield 226 is provided with the same slits 212, 214, and 216 as in the embodiment of FIG. 3A. The slits 212, 214, and 216 likewise form triangular-shaped flaps 220 and 222 which spread apart to admit the eyepiece 16 when the glare shield 226 is inserted onto the camcorder viewfinder eyepiece 16 as previously described.

The glare shield 226 is also provided with a pair of peripheral demarcation slits 228 that extend from its upper corners from the outer perimeter of the structure of the glare shield 226 in a converging fashion, as illustrated. The slits 228 may be between about three-quarters of an inch and one inch in length and define a wide, fan-shaped tab 230 therebetween. The tab 230 is bounded on its opposing sides by attachment margins 232.

Figure 3C:
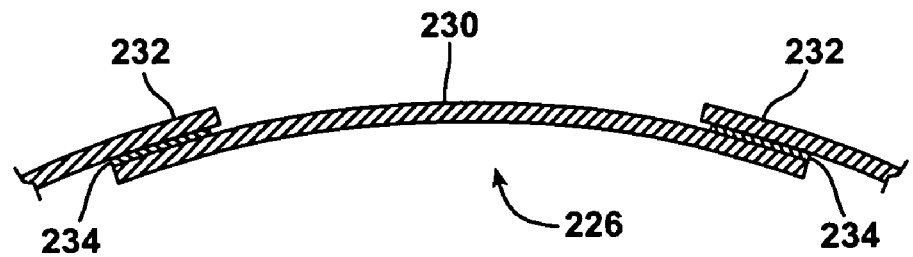
FIG. 3C is a top plan detail illustrating one manner of forming the hood shown in FIG. 3B into a three-dimensional arcuate structure.
Figure 3D:
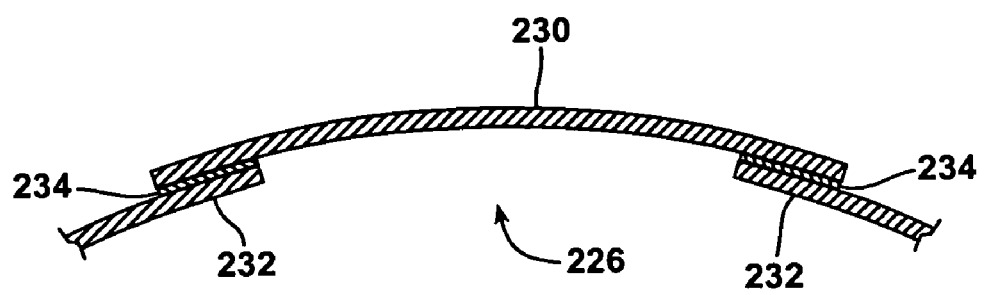
FIG. 3D is a top plan detail illustrating another manner of forming the hood shown in FIG. 3B into a three-dimensional arcuate structure.

Since the glare shield 226 is formed from a flat sheet of black paper, it is advisable to configure its structure into a three-dimensional canopy that has an arcuate curvature concave toward the face of the user. Accordingly, the glare shield 226 may be provided with strips of tape 234 having adhesive on both opposing faces. The strips of tape 234 may be utilized to secure the ends of the tab 230 to the attachment margins 232 in overlapping fashion so that the glare shield 226 is formed into a canopy that is concave toward the face of the user. The attachment margins 232 may either be overlapped behind the ends of the tab 230 and secured thereto by the strips of tape 234, as illustrated in FIG. 3C, or overlapped in front of the ends of the tab 230, as illustrated in FIG. 3D.

Figure 6:
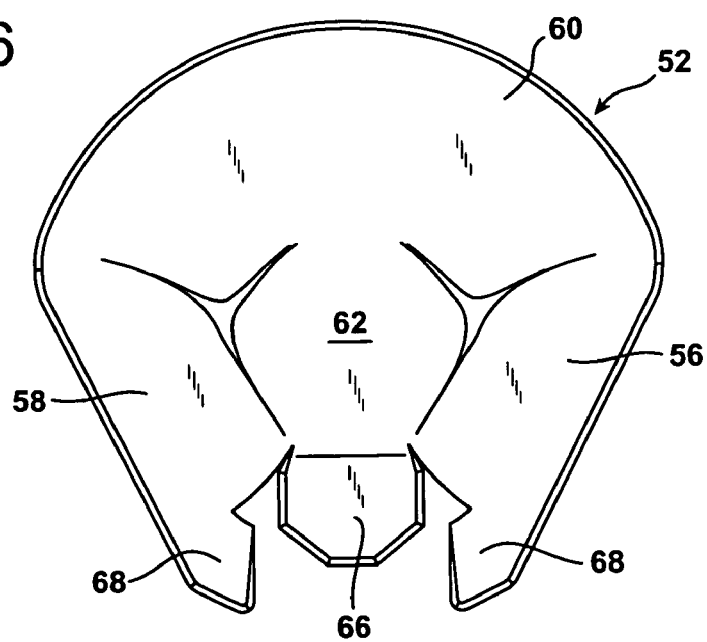
FIG. 6 is a front elevational view of a glare shield designed for use with a still camera having a flash attachment mounting bracket.
Figure 7:
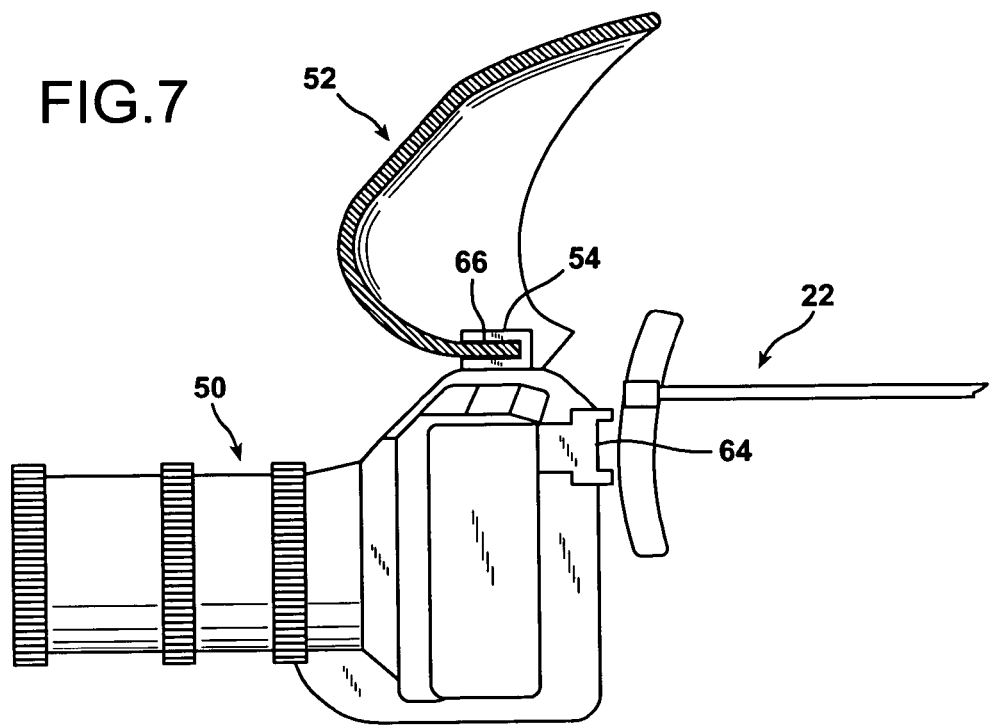
FIG. 7 is a side sectional view illustrating the glare shield of FIG. 6 attached to a still camera.

FIGS. 6 and 7 illustrate an alternative embodiment of the glare shield of the invention designed for use with a still camera 50. The glare shield 52 illustrated in FIG. 6 is configured for attachment to the camera flash attachment mounting clip or bracket 54, typically located atop the body structure of a still camera 50. The flash attachment clip 54 of a conventional still camera 50 of this type is configured to define a narrow, horizontally oriented slot that is open in a longitudinal direction to receive a mounting tongue of a conventional camera flash attachment. Such a flash attachment is typically utilized only in low ambient light levels. Under such conditions the metal or plastic tongue of the flash attachment is inserted into the clip 54 so that the camera flash attachment is stabilized atop the body of the camera 50. In high ambient light levels, the use of a flash attachment is neither necessary nor desirable.

According to the present invention the glare shield 52 is provided with wings 56 and 58 on its sides and a camera hood canopy 60 projecting upwardly from a central region 62 located between the wings 56 and 58. The wings 56 and 58 and the hood canopy 60 together with the central region 62 form a shade structure that is concave in the direction facing forwardly from the camera 50 toward the position where the camera operator is located.

In most conventional still cameras, such as the camera 50, there is a small view finding window 64 located on the rear surface of the camera 50, usually directly beneath the flash attachment clip 54. In framing a picture through the viewfinder window 64, a user wearing glasses will typically view the scene through the window 64 through one eye. In such a case, the lens 24 of the eyeglasses 22 will be positioned immediately to the rear of the viewing window 64 between the viewing window 64 and the user's eye.

Without a glare shield such as the glare shield 52 of the present invention, the vision of the photographer is obscured by ambient light entering the viewing window 64 by reflection or from the sides of the eyeglass lens 24, much in the manner illustrated and described in connection with FIG. 1. However, the glare shield 52 of the invention provides a convenient means for drastically cutting down the level of ambient light that interferes with the photographer's vision through the viewing window 64. Specifically, the glare shield 52 is provided with a tapered tongue 66 that projects forwardly from beneath the central region 62 and between the lower extremities of the wings 56 and 58 of the glare shield 52, as illustrated in FIGS. 6 and 7.

As shown in FIG. 7, the tongue 66 is inserted into the forwardly opening channel defined in the flash attachment clip 54 atop the camera 50 and is engaged therewithin by friction. The lower extremities of the wings 56 and 58 are preferably configured with feet 68 that are pressed against the upper surface of the body of the camera 50 and thereby folded to extend forwardly toward the photographer when the tongue 66 is inserted into the flash attachment slot defined in the flash attachment mounting clip 54. The lower extremities of the wings 56 and 58 thereby provide a shading effect on both sides of the flash attachment mounting clip 54 when the glare shield 52 is installed for use on the camera 50, as illustrated in FIG. 7. This construction aids in blocking entry of ambient light about the periphery of the flash attachment mounting clip 54.

When the glare shield 52 is installed atop the camera 50, as illustrated in FIG. 7, it casts a significant shadow upon the user's eyeglass lens 24 when the lens 24 is positioned immediately behind the viewing window 64. This shadow greatly aids the photographer in properly framing the picture to be taken, since interference from ambient light is reduced to a very pronounced degree.

The glare shield 52 may be constructed of the same materials as the glare shield 32. Like the glare shield 32, the glare shield 52 is formed of a soft rubber foam, or plastic material that will not scratch the photographer's eyeglass lenses 24 if the glare shield 52 comes into contact with the lenses 24. The glare shield 52 is preferably colored black to absorb as much as possible the light that strikes it. Like the glare shield 32, the glare shield 52 is collapsible so that it will fit into the photographer's pocket or camera bag when not required for use. Also, the structure of the glare shield 52 is sufficiently resilient so that the tongue 66 can fit into many different sizes of flash attachment mounting clips 54.

Figure 6A:
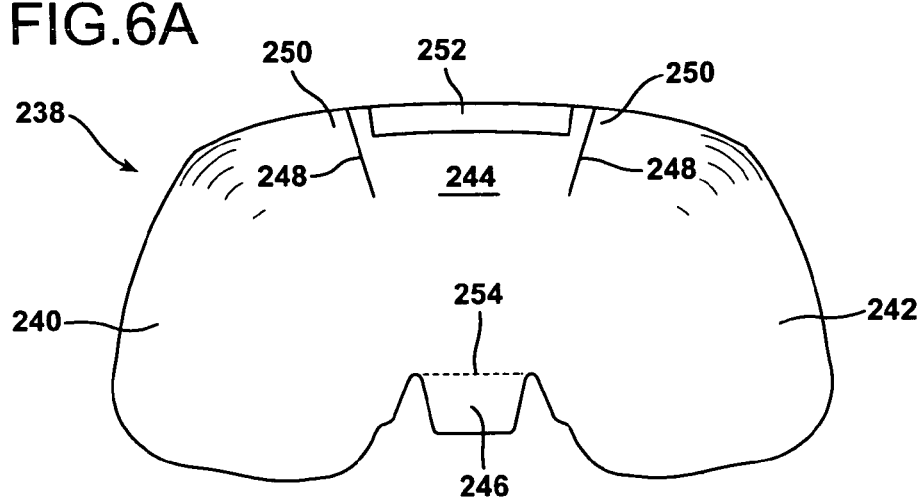
FIG. 6A is a front elevational view of a disposable alternative to the embodiment illustrated in FIG. 6.

A comparable glare shield 238 may be fabricated as a disposable item. The disposable glare shield 238 is illustrated in FIG. 6A which illustrates the glare shield 238 in plan view in a flattened form. The glare shield 238 may be constructed of fairly stiff black paper and is configured with a pair of side wings 240 and 242 located on opposing sides of a central region which has a wide, fan-shaped tab 244 at the top and a generally trapezoidal-shaped tongue 246 at the bottom of the central region. Slits 248 are formed at the top of the central region and are directed downwardly in a slightly converging fashion to form the tab 244 and delineate it from adjacent fastening margins 250.

Figure 6B:
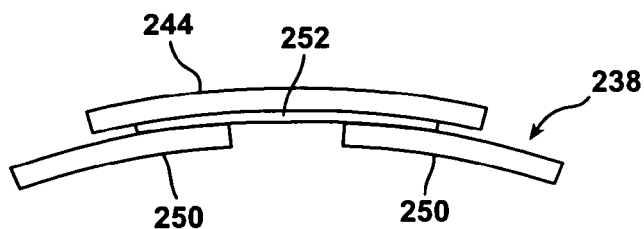
FIG. 6B is a top plan detail showing how the embodiment of FIG. 6A may be configured into a three-dimensional arcuate shape.

A strip of tape 252 having adhesive on both sides is fastened to extend across the top of the tab 244. The glare shield 238 may be configured into a hood-shaped structure by pulling the fastening margins 250 toward the center of the tab 244 and pressing them against the tape 252 to transform the glare shield 238 from a flat structure in the form in which is sold and stored, as illustrated in FIG. 6A, to an arcuately curved structure that provides better shading on its concave side toward the face of the user, as illustrated in FIG. 6B. The tongue 246 may be folded along the horizontal fold line 254 so that the tongue 246 may be inserted into the slot of the flash attachment clip 54 of the camera 50, similar to the manner in which the glare shield 52 is mounted.

Figure 6C:
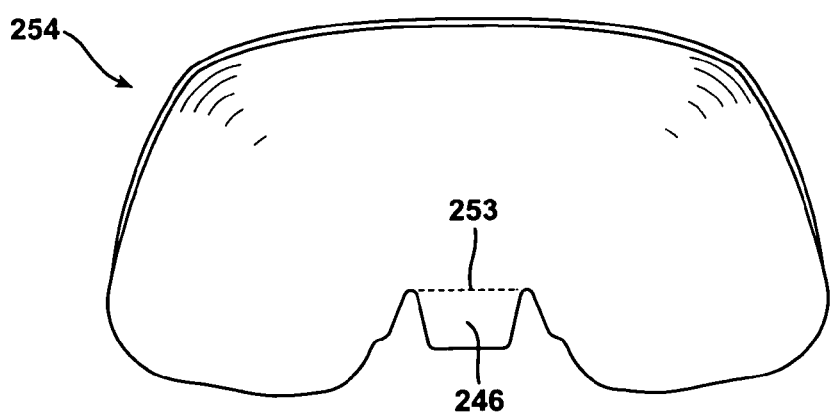
FIG. 6C is a front elevational view of a nondisposable alternative to the embodiment illustrated in FIG. 6A.
Figure 7A:
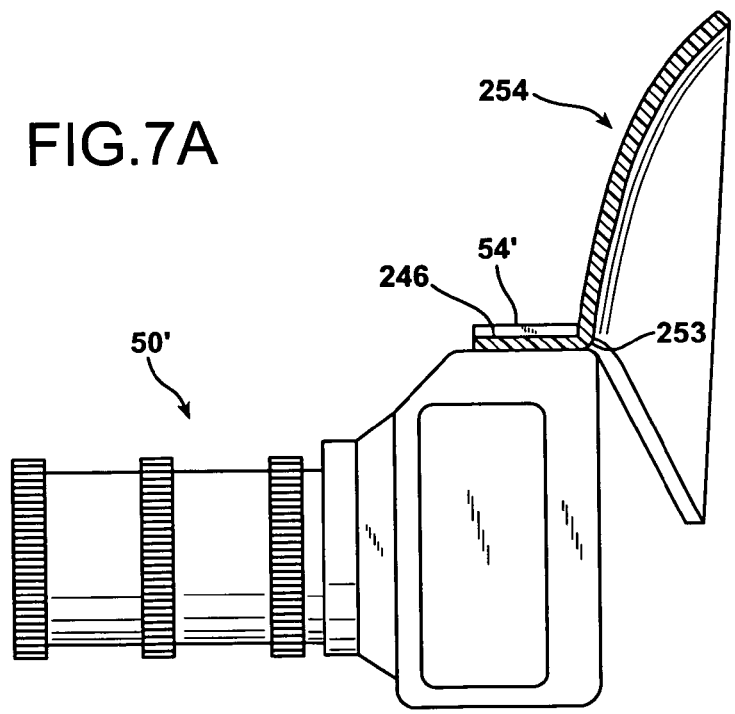
FIG. 7A is a side sectional view illustrating the glare shield of FIG. 6C attached to a still camera.

Another similar glare shield 254 is illustrated in FIG. 6C. The glare shield 254 is a reusable structure formed into an arcuately curved configuration, convex rearwardly, toward the face of the user. The glare shield 254 may be formed, for example, of ethylene vinyl acetate polypropylene (cross-linked). The glare shield 254 also has a tongue 246 that may be bent toward the face of the user along the fold line 253 for insertion into the slot of the flash attachment clip 54 of the camera 50 in the manner illustrated in FIG. 7A. In some cameras, such as the camera 50' illustrated in FIG. 7A the best access to the flash attachment clip 54' is from the rear of the camera. The glare shield 254 is versatile enough so that the tongue 246 may be bent in the opposite direction, away from the face of the user and inserted into the camera flash attachment clip 54' as illustrated in FIG. 7A.

Figure 8:
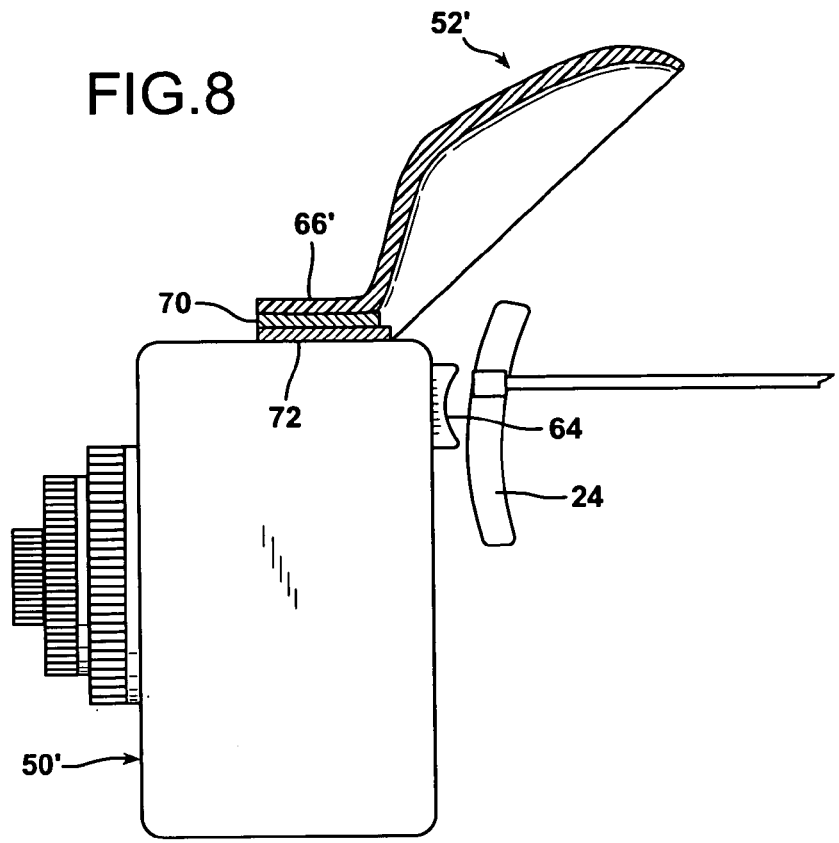
FIG. 8 is a side sectional view illustrating a different attachment mechanism for a another embodiment of the glare shield of the invention attached to a still camera.

FIG. 8 illustrates an alternative embodiment of a glare shield at 52'. The glare shield 52' is constructed generally in the shape of the glare shield 52. However, instead of having a tongue 66 that is adapted to fold to extend forwardly for insertion into a flash attachment clip 54, the tongue 66' of the glare shield 52' is adapted to fold rearwardly away from the user. On its underside the tongue 66' is provided with a fabric strip 70 bearing a multiplicity of tiny hooks. A corresponding fabric strip 72 bearing a mating looped pile is adhesively secured to the top of the body of the still camera 50', which is not equipped with an upwardly projecting flash attachment mounting clip 54. The fabric strips 70 and 72 cooperate in the manner described in U.S. Pat. No. 2,717,437, which is hereby incorporated by reference in its entirety, but are much thinner. The strips 70 and 72 may be of the type sold under the name Grippit.

As with the glare shield 52, the glare shield 52' is removably secured atop the camera 50'. Attachment is achieved merely by placing the fabric male fastener strip 70 that is adhesively secured to the underside of the tongue 66' atop the corresponding mating fabric female strip 72 that is adhesively secured to the top of the body of the camera 50'. The glare shield 52' will thereupon assume the position illustrated in FIG. 8. In this position the glare shield 52' casts a shadow on the eyeglass lens 24 of a photographer viewing a scene to be photographed through the conventional viewfinder window 64 of the camera 50'. The glare shield 52' is also collapsible so that it can be carried in the photographer's pocket or camera bag. Also, there are no particular size constraints so that the same glare shield 52' can be used on numerous different models of cameras 50' in the manner illustrated in FIG. 8. In some embodiments double sided tape or magnetic strips may be substituted for the flexible fabric hook and loop fastening system strips 70 and 72.

Figure 8A:
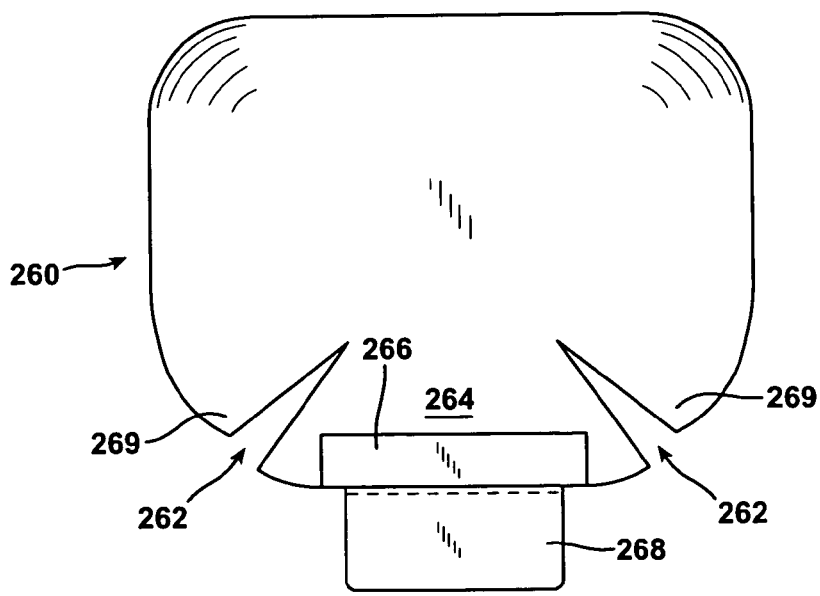
FIG. 8A is a plan view of an alternative embodiment of a disposable glare shield also designed for use for mounting on a still camera in the manner illustrated in FIG. 8.

The glare shield 52' illustrated in FIG. 8 is a reusable structure that may be formed of some reasonably durable material, such as ethylene vinyl acetate polypropylene (cross-linked). A disposable version of a comparable glare shield is illustrated in FIG. 8A. The glare shield 260 is shown in plan view in a flattened condition in FIG. 8A. The glare shield 260 is formed of stiff black paper and has a pair of narrow notches 262 cut into its structure on either side of the lower portion of the central region thereof to create a fan-shaped, generally upright base 264 having a laterally extending, narrow, rectangular strip of double faced tape 266 at its lower extremity. The notches 262 delineate the base 264 from adjacent fastening margins 269. The tape strip 266 may be provided separately or already attached to either the base 264 or the fastening margins 269 with release paper on only one of its surfaces. A depending mounting tab 268 projects downwardly from the base 264.

To utilize the glare shield 260, the fastening margins 269 are drawn inwardly toward the center of the upright base 264 and pressed against the rearwardly facing surface of the tape 266. This manipulation of the structure of the glare shield 260 transforms it from a flat, planar structure illustrated in FIG. 8A to an arcuately curved hood-shaped structure as illustrated in FIG. 8B.

Figure 8B:
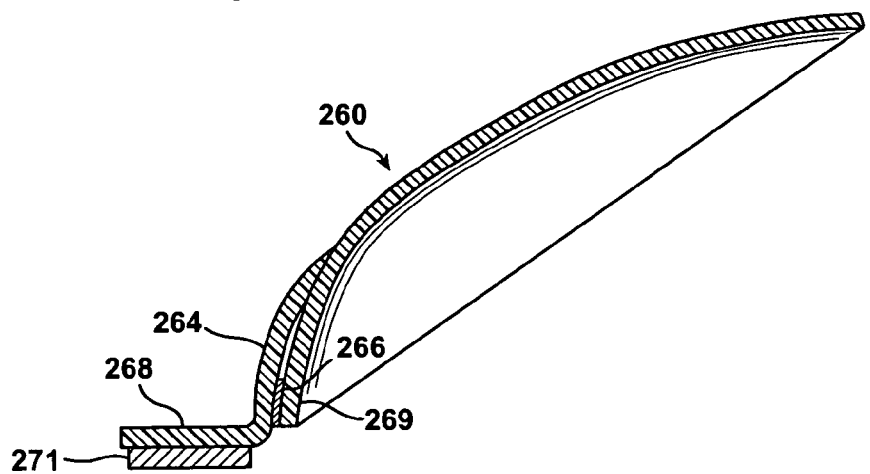
FIG. 8B is a side sectional detail illustrating the manner in which the glare shield of FIG. 8A is deployed for mounting on a still camera.
Figure 8C:
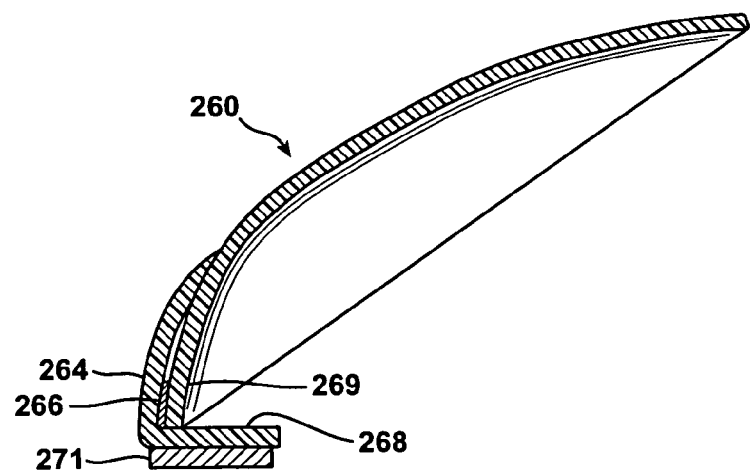
FIG. 8C is a side sectional detail illustrating a variation of the glare shield of FIG. 8B.

The glare shield 260 is illustrated in its deployed condition in the side sectional, elevational view of FIG. 8B, ready for attachment to the top of a camera. As can be seen in that drawing figure the attachment tongue 268 may be equipped with a double sided strip of adhesive tape 271. The adhesive tape strip 271 may be sold along with the glare shield 260 initially covered with a release backing on both sides. This allows the adhesive tape strip 271 to be attached to either side of the attachment tongue 268. As illustrated in drawing FIG. 8B the adhesive tape strip 271 may be attached to the tongue 268 so that the tongue 268 projects forwardly away from the user with the underside of the adhesive tape strip 271 attached to the top of a camera. Alternatively, the adhesive tape strip 271 may be attached to the other side of the tongue 268 and the tongue 268 may be directed toward the user as illustrated in drawing FIG. 8C. In either case the adhesive tape strip 271 holds the disposable glare shield 260 in an orientation curved concave toward the viewer.

FIGS. 9–13 illustrate another embodiment of the invention in which a glare shield 80 is configured for use in shading a folding LCD screen panel 18 of a camcorder 14. Such an LCD screen panel 18 is a conventional feature of most camcorders 14 that are currently sold commercially. The LCD screen 18' located on the front surface of the LCD panel 18 may have a nominal size of two inches, two and a half inches, three inches, three and a half inches, or four inches. Different camcorder models have different size video screens and the LCD glare shield 80 has dimensions appropriate for the size of the LCD screen 18' with which it is to be utilized.

Figure 12:
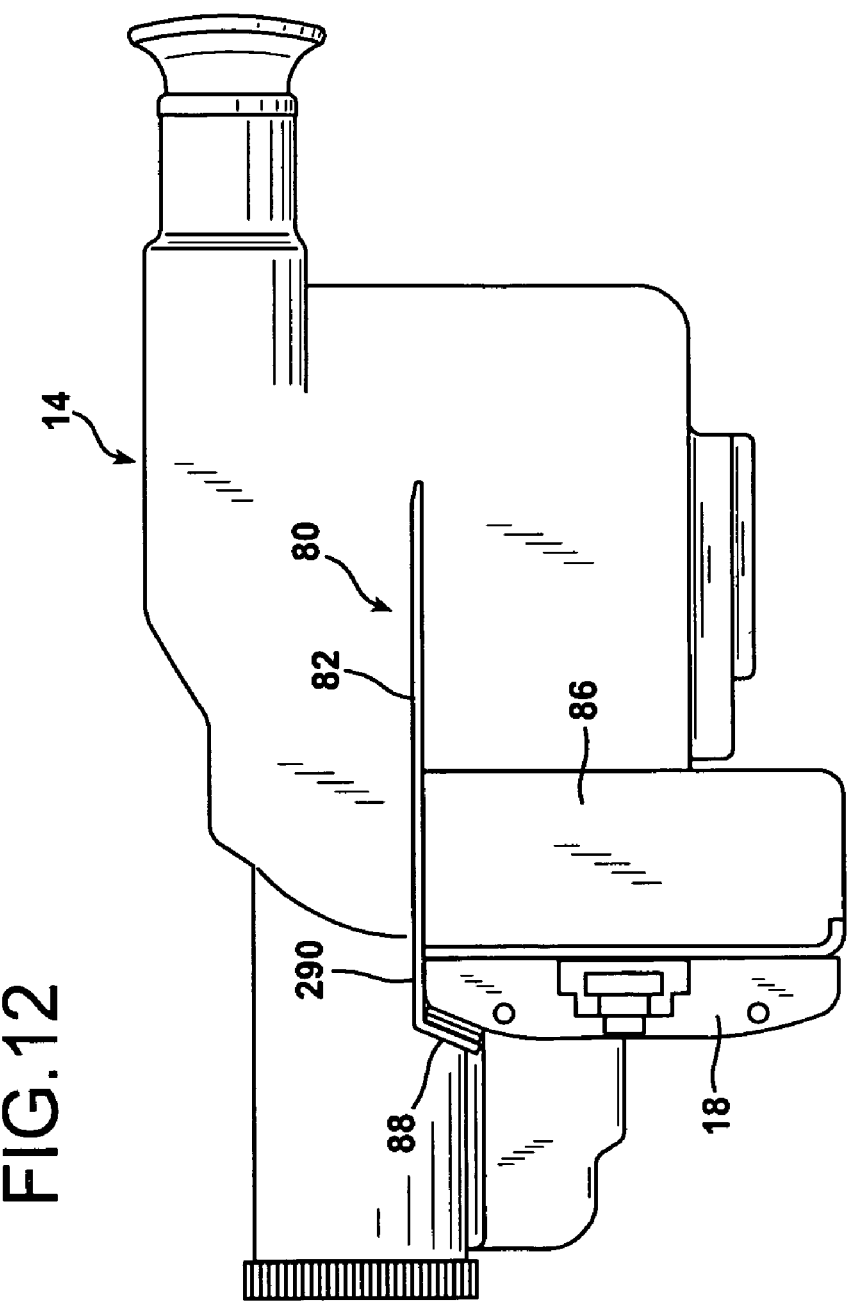
FIG. 12 is a side elevational view illustrating the glare shield of FIG. 10 mounted upon a fold-out LCD screen of a video camera.
Figure 13:
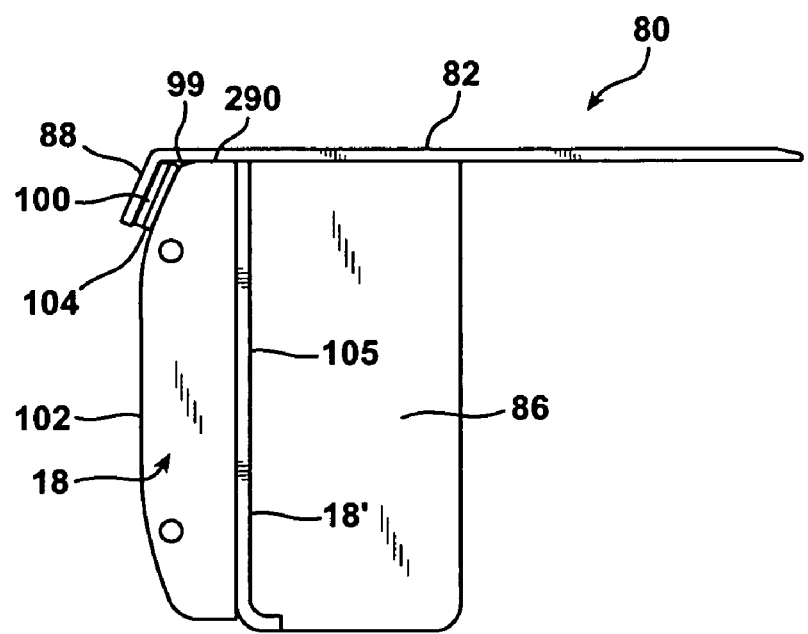
FIG. 13 is a side elevational detail of a portion of FIG. 12.
Figure 14:
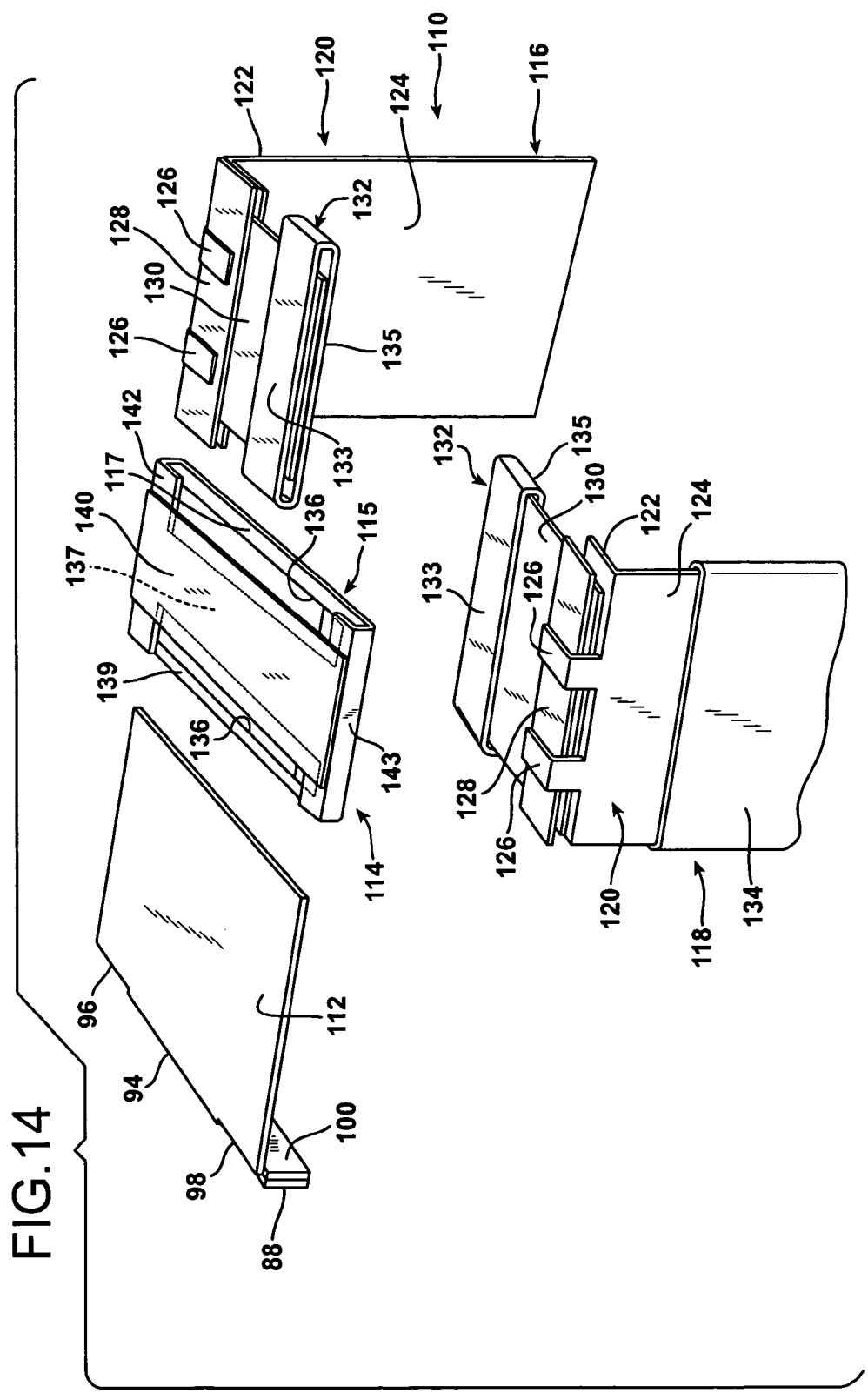
FIG. 14 is an exploded front-left perspective view illustrating an alternative embodiment of the glare shield to that depicted in FIG. 10 in which the separation between the side shades is adjustable and the length of the outboard side shade is extendible.
Figure 15:
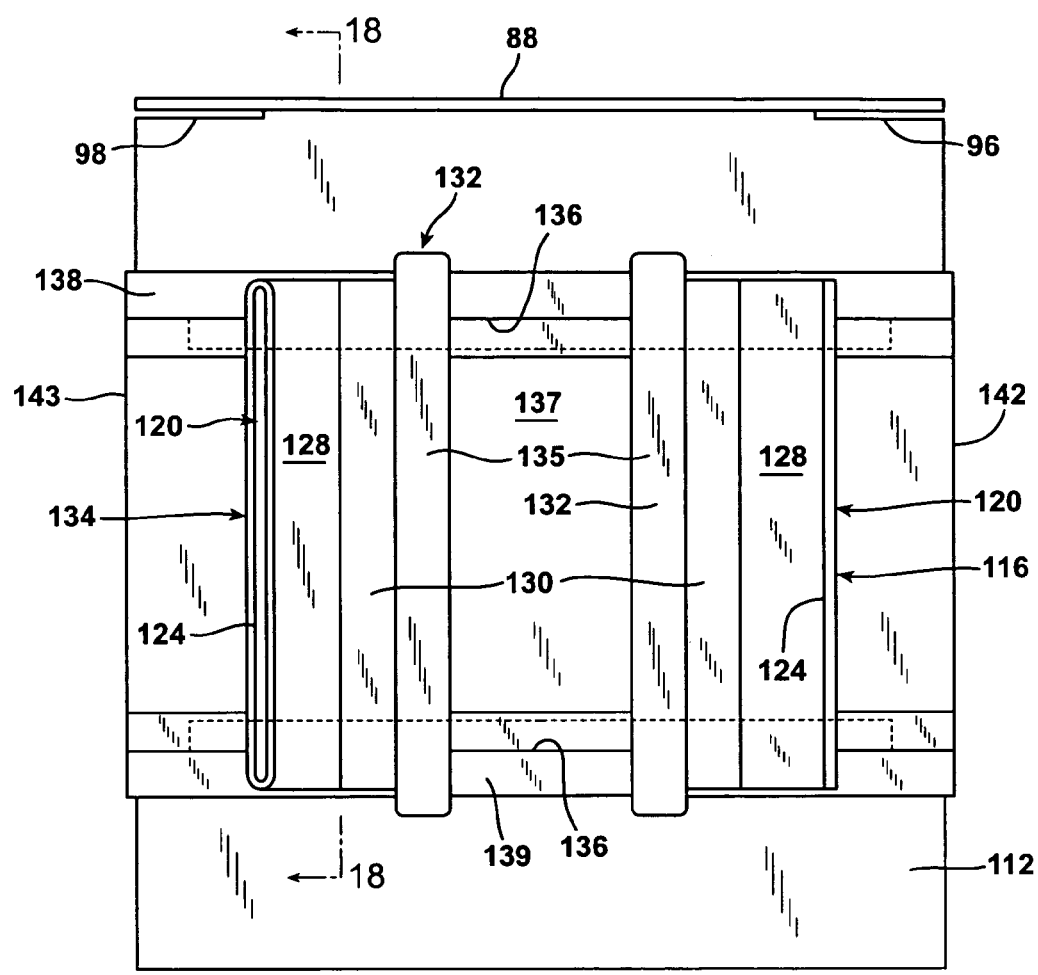
FIG. 15 is a bottom plan view of the glare shield shown in FIG. 14 with the component parts assembled together.
Figure 16:
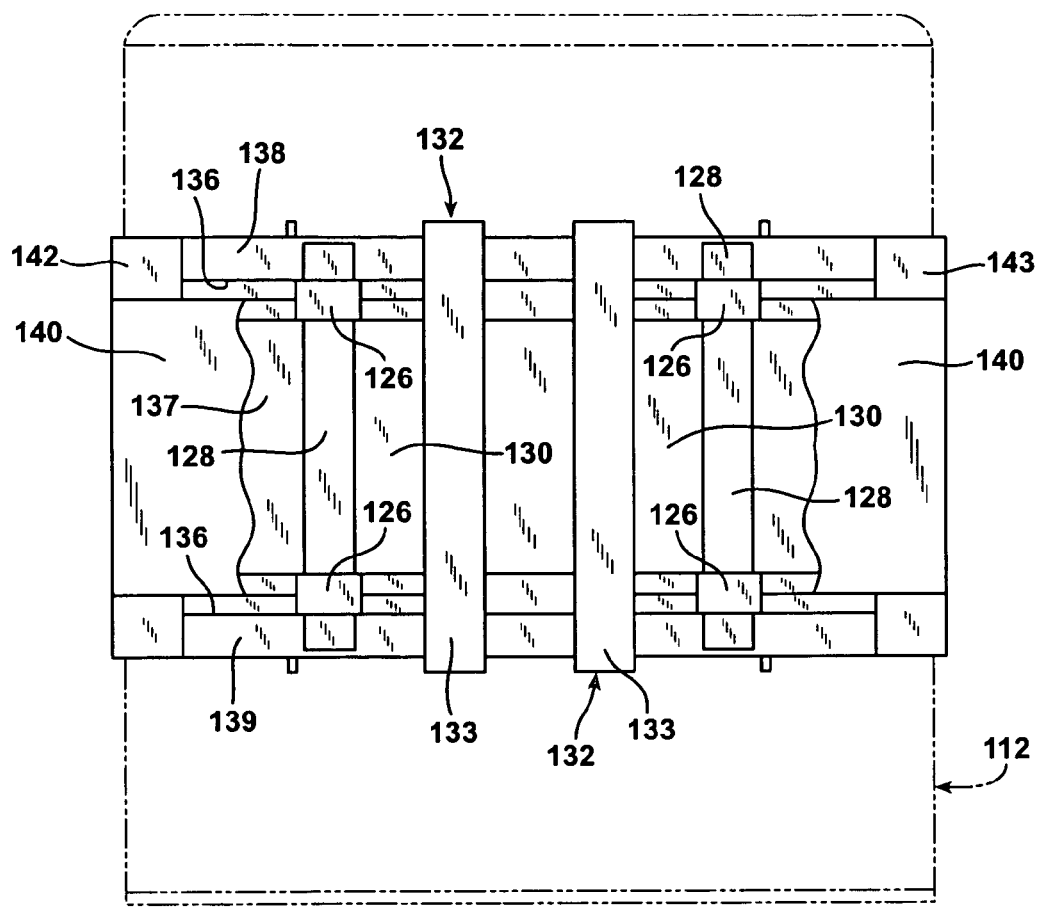
FIG. 16 is a top plan view of the glare shield of FIG. 15 with the roof panel shown in phantom, and with other portions partially broken away.

The folding LCD viewing screen panel 18 in most of the models of camcorders 14 sold commercially in this country is located on the front face of a folding panel on the left-hand side of the body of the camcorder 14, considered from the standpoint of the position of the photographer. The panel 18 for the LCD screen 18' has a generally flat shape and the LCD screen panel 18 folds out from a cavity in the side of the camera body into an orientation substantially perpendicular to the body of the camcorder 14 when in use, as illustrated in FIGS. 12 and 13.

The glare shield 80 is comprised of a flat, generally rectangular roof 82, an inboard side panel flap 84, an outboard side panel flap 86, and a folding mounting strip 88 that is located at the rear edge of the roof 82 remote from the user.

Figure 9:
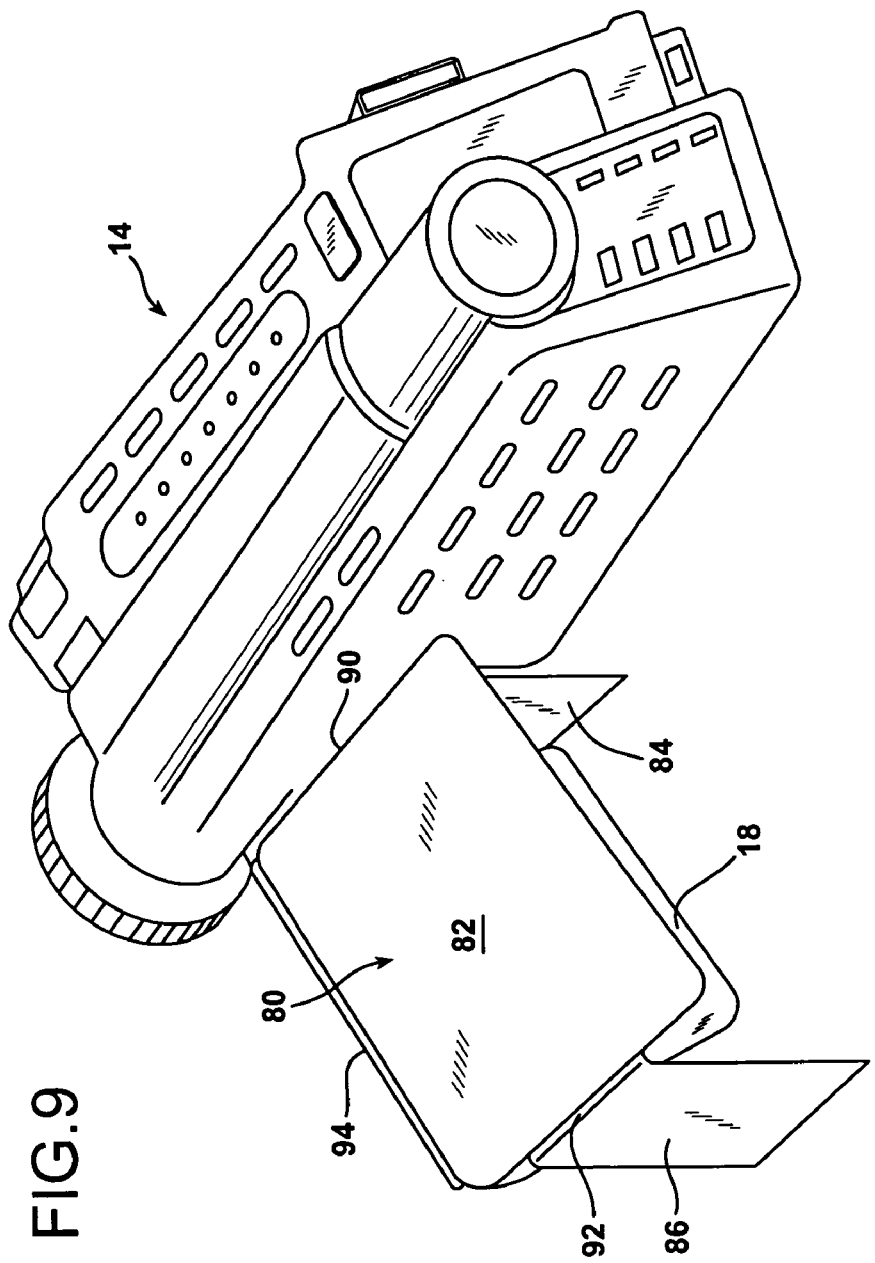
FIG. 9 is an upper front perspective view illustrating another embodiment of the glare shield of the invention attached to a video camera fold-out LCD screen.
Figure 10:
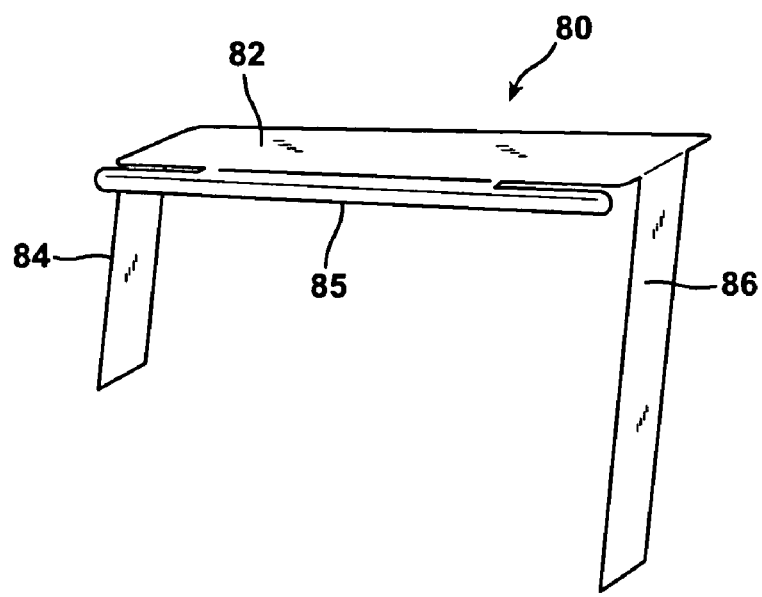
FIG. 10 is a rear perspective view showing the glare shield employed in FIG. 9 in isolation.
Figure 11:
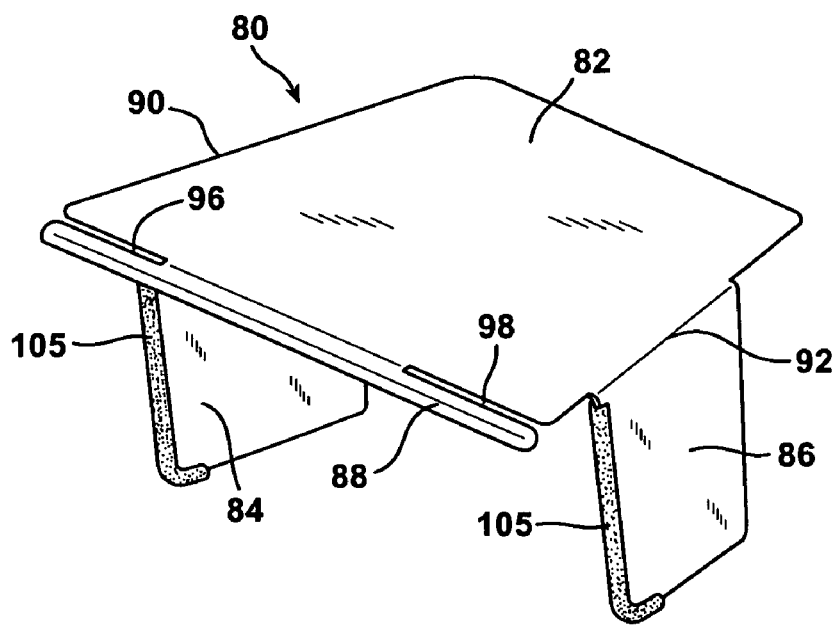
FIG. 11 is a rear, left-side perspective view of the glare shield illustrated in FIG. 10.

The side panel flaps 84 and 86 are attached by hinge folds 90 and 92 at the inboard and outboard side edges of the roof 82, respectively. When the glare shield 80 is to be stored when not in use, the side panel flaps 84 and 86 may be folded upwardly together into a stored condition against the underside of the roof 82 and the mounting strip 88 may be unfolded to extend rearwardly in a generally coplanar relationship with the roof 82. When the glare shield 80 is to be utilized, however, the side panel flaps 84 and 86 are unfolded relative to the roof 82 so that they extend downwardly in a deployed condition into a generally perpendicular orientation relative to the roof 82 at inboard and outboard locations relative to the camcorder 14, as illustrated in FIG. 9. The structure of the roof 82, the side panel flaps 84 and 86, and the mounting strip 88 is preferably colored black and is formed of stiff, but somewhat resilient, card stock, or of some stiff, but reasonably resilient sheet-like plastic or foam material.

Although the mounting strip 88 folds downwardly from the rear edge of the roof 82 at a linear fold line 94, it should be noted that slots 96 and 98 exist between the inboard and outboard extremities of the mounting strip 88 and the roof 82. The inboard and outboard ends of the mounting strip 88 can thereby be bent somewhat to conform to the slightly convex curvature of the rear surface of the frame in which the LCD screen 18 is set.

As shown in FIG. 13, a thin, narrow, elongated layer 100 of flexible fabric hook and loop fastener material bearing a multiplicity of tiny hooks is adhesively or otherwise secured to the underside of the mounting strip 88. The strip of fabric fastener material 100 extends longitudinally the entire length of the underside of the mounting strip 88 and is secured thereto by adhesive.

Typically, the top edge surface 290 and rear surface 102 of the LCD screen panel 18 is formed of a nonmetallic material, such as aluminum or plastic. A mating flexible fabric hook and loop fastener strip 104 bearing a looped pile that is releaseably engaged by the hooks on the strip 100 is adhesively, or otherwise, permanently secured to the upper edge 99 or the rear surface 102 of the frame of the LCD screen panel 18. The strip 104 is of a length and width corresponding to the length and width of the magnetic layer 100. The strips 100 and 104 may be those of the type sold under the name Grippit, as previously described. The glare shield roof 80 is positioned atop or immediately forward of the upper edge surface 290 of the LCD screen panel 18 with the inboard side panel flap 84 located immediately adjacent the body of the camcorder 14, and with the outboard side panel flap 86 extending downwardly from the underside of the roof 82 parallel to and laterally separated from the inboard side panel flap 84. The underside of the mounting strip 88 of the glare shield 80 is then pressed against the rear surface 102 or the top edge surface 290 of the frame of the LCD screen panel 18 so that the thin, flat hook and loop fastener layer 100 that is permanently attached to the underside of the glare shield mounting strip 88 resides in direct contact with the mating thin, flat hook and loop fastener layer 104 that is permanently attached to the top surface 290 or rear surface 102 of the frame of the LCD screen 18. The interengagement of the minute hooks of the elongated layer 100 and the looped pile of the layer 104 thereby holds the glare shield 80 in position with the roof 82 projecting forwardly toward the photographer atop the LCD screen 18'. The side panel flaps 84 and 86 extend downwardly along the inboard and outboard edges of the LCD screen 18', respectfully.

Also, in some cameras the top surface 290 or the rear surface 102 of the LCD screen panel 18 is formed of steel or some other material attracted by magnetism. In such cases, a magnetic strip on the underside of the mounting strip 88 may replace the fabric hook and loop fastener strips 100 and 104. The magnetic strip may be positioned in direct contact with the top surface 290 or the rear surface 102 of the LCD screen and will adhere magnetically thereto. The magnetic adherence of the magnetic layer to the top surface 290 or rear surface 102 of the LCD screen panel 18 will thereby hold the glare shield 88 in the position, as illustrated in FIG. 9.

It is to be understood that different thin fastening mechanisms may be employed in accordance with the invention. For example, a strip of material that exerts a force of magnetic attraction could be substituted for either the strip 100 or the strip 104, and a material attracted by magnetism could be substituted for the other of those strips. Other fastening mechanisms may be employed as well.

The inboard side panel flap 84 projects downwardly from the underside of the roof 82 a distance at least as great as the height of the LCD screen 18', and preferably below the lower edge of the LCD screen 18'. The outboard side panel flap 86 is preferably the same length as the inboard side panel flap 84. The edges of the inboard and outboard side panel flaps 84 and 86 are preferably provided with liners 105 formed of soft rubber or some other material that will not damage the face of the LCD screen 18'. The lining material 105 extends along the vertical edges of the side panel flaps 84 and 86 that face the LCD screen 18', and also along the curvature at the transition between those edges with the bottom edges of the side panel flaps 84 and 86, as illustrated in FIGS. 12 and 13.

The dimensions of the roof 82 and the inboard and outboard side panel flaps 84 and 86 of the glare shield 80 are selected according to the particular model of camcorder 14 with which the glare shield 80 is to be utilized. Therefore, for different sizes of LCD screens 18' there will be different sizes of glare shields 80, which will vary with different camera models. In a typical situation in which the LCD screen is three or 3½ inches in width and a little more than two inches in height, the roof 82 will be constructed to have a width of about 3½ inches and a length projecting from the strip 88 toward the photographer a distance of between about two and about four inches.

It can be seen that the glare shield 80 is completely collapsible. The side panel flaps 84 and 86 may be folded up against the underside of the roof 82 and the mounting strip 88 may be unfolded to lie in the plane of the roof 82. The glare shield 80 is thereby easily attachable to and detachable from an LCD screen panel 18 and may be compactly flattened and carried in the user's pocket or camera bag.

Figure 12A:
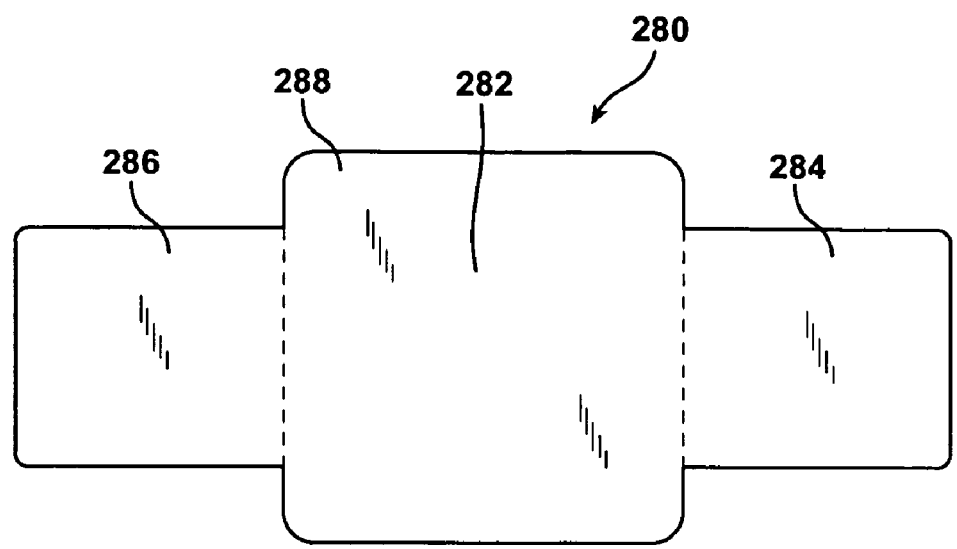
FIG. 12A is a plan view illustrating an alternative embodiment of the glare shield of FIG. 10.

FIGS. 12A and 13A illustrate another embodiment of the glare shield of the invention. The glare shield 280 has the same general configuration as the glare shield 80, but is of a somewhat different construction. The glare shield 280 has a flat roof 282, an inboard side flap 284, and an outboard side flap 286. The glare shield 280 is illustrated in plan view in a flattened condition in FIG. 12A. In one preferred construction the roof 282 has a square shape, about four inches on a side, while the side flaps 284 and 286 are about two and three-quarters inches in length and about two and one-quarter inches in width.

The glare shield 280 has a front margin 288 that serves as a flat mounting strip and resides in coplanar relationship with the roof 282. As illustrated in FIG. 13A there is a strip of double sided adhesive tape 289 secured to the underside of the forward margin 288. The adhesive tape 289 may be pressed downwardly against the flat upper surface 290 of the frame of the LCD screen panel 18 so as to hold the glare shield 280 in position with the side flaps 284 and 286 shielding the surface of the LCD screen 18' from ambient light at the side, while the roof 282 shields the LCD screen 18' from ambient light from above.

The glare shield 280 is preferably formed of some inexpensive material so that it is normally utilized as a disposable item. If constructed of a more durable material so that it is reusable, a flexible fabric hook and loop fastening system, such as that marketed under the name Grippit, could be substituted for the strip of tape 289. Likewise, a magnet could be employed in place of the strip of adhesive tape 289, provided that the frame of the LCD screen 18 his constructed of steel or has a layer of magnetically attractive material secured to the top surface 290.

FIG. 13B illustrates another variation of the glare shield 280. The glare shield 294 depicted in that drawing figure has a roof 82 and side panel flaps 84 and 86 as in the embodiment of FIG. 9. However, the mounting strip 296 at the forward edge of the roof 82 is bent downwardly at an angle and has a thin, slick, plastic reinforcing strip 298 secured to its underside. A U-shaped retaining clip 300 is secured by adhesive tape 302 to the back surface 102 of the frame of the LCD screen 18. The U-shaped mounting clip 300 extends across the width of the back surface 102 of the frame of the LCD screen 18, and the mounting strip 296 is coextensive therewith. The mounting strip 296 fits down into the upwardly facing concave channel of the clip 300 with the roof 82 and the side panel flaps 84 and 86 shielding the face of the LCD screen 18 from ambient light.

FIGS. 14 through 19 illustrate another embodiment of a glare shield that may be utilized in place of the glare shield 80 on all of the different size folding LCD screens 18 that are provided on camcorders 14 that are commercially available today. Specifically, the glare shield 110 illustrated in these drawing figures has an adjustable width that allows it to be utilized on different sizes of LCD screens 18.

The glare shield 110 is comprised of several different parts which are movable relative to each other. Specifically, the glare shield 110 is comprised of a roof 112, a coupling rack 114, an inboard side flap 116, and an outboard side flap 118. These components are illustrated separated from each other in FIG. 14, but are depicted as assembled together in FIGS. 15, 16, 18, and 19.

Figure 17:
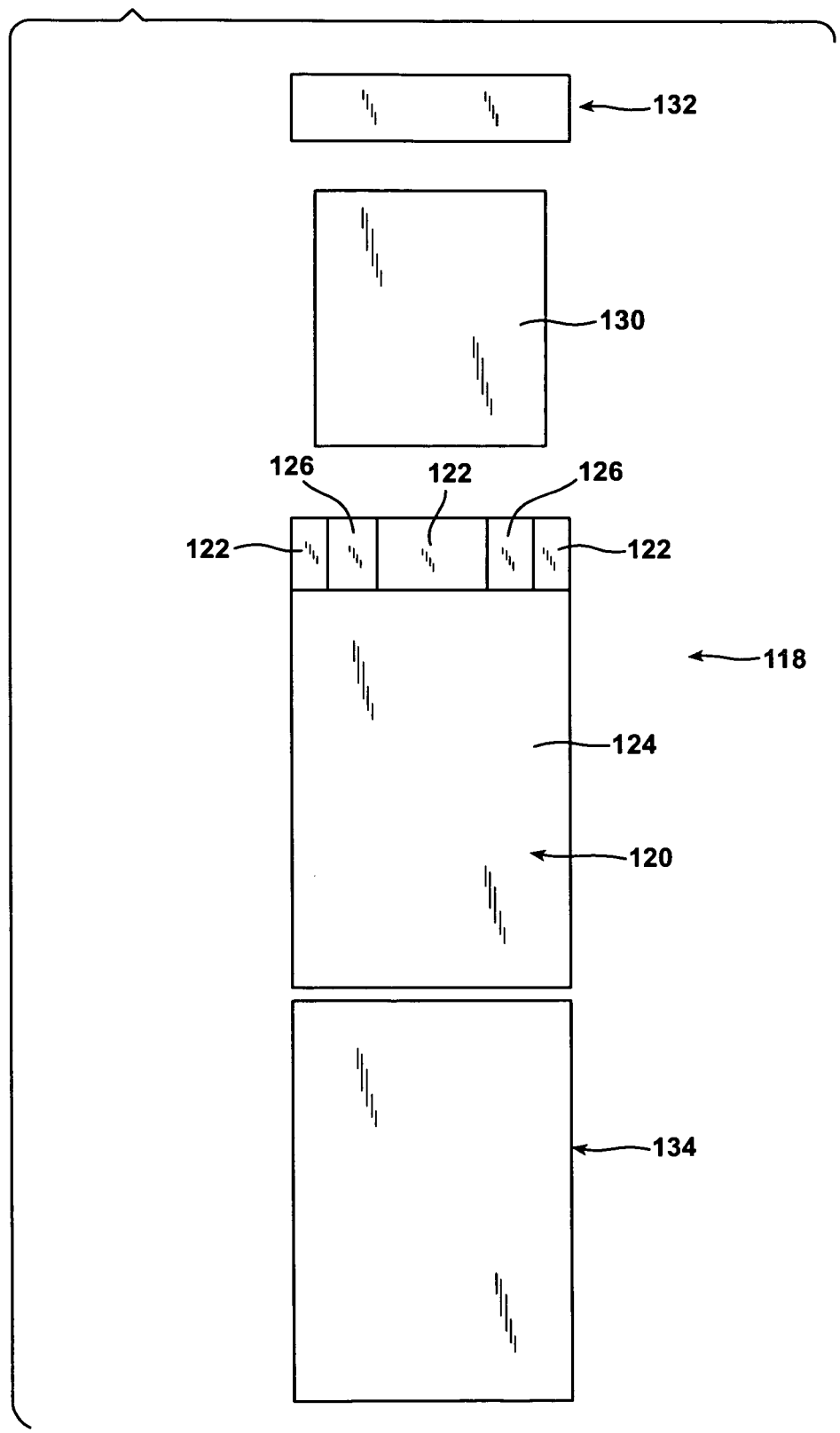
FIG. 17 is an exploded side view of the outboard side flap of the glare shield of FIG. 15.
Figure 18:
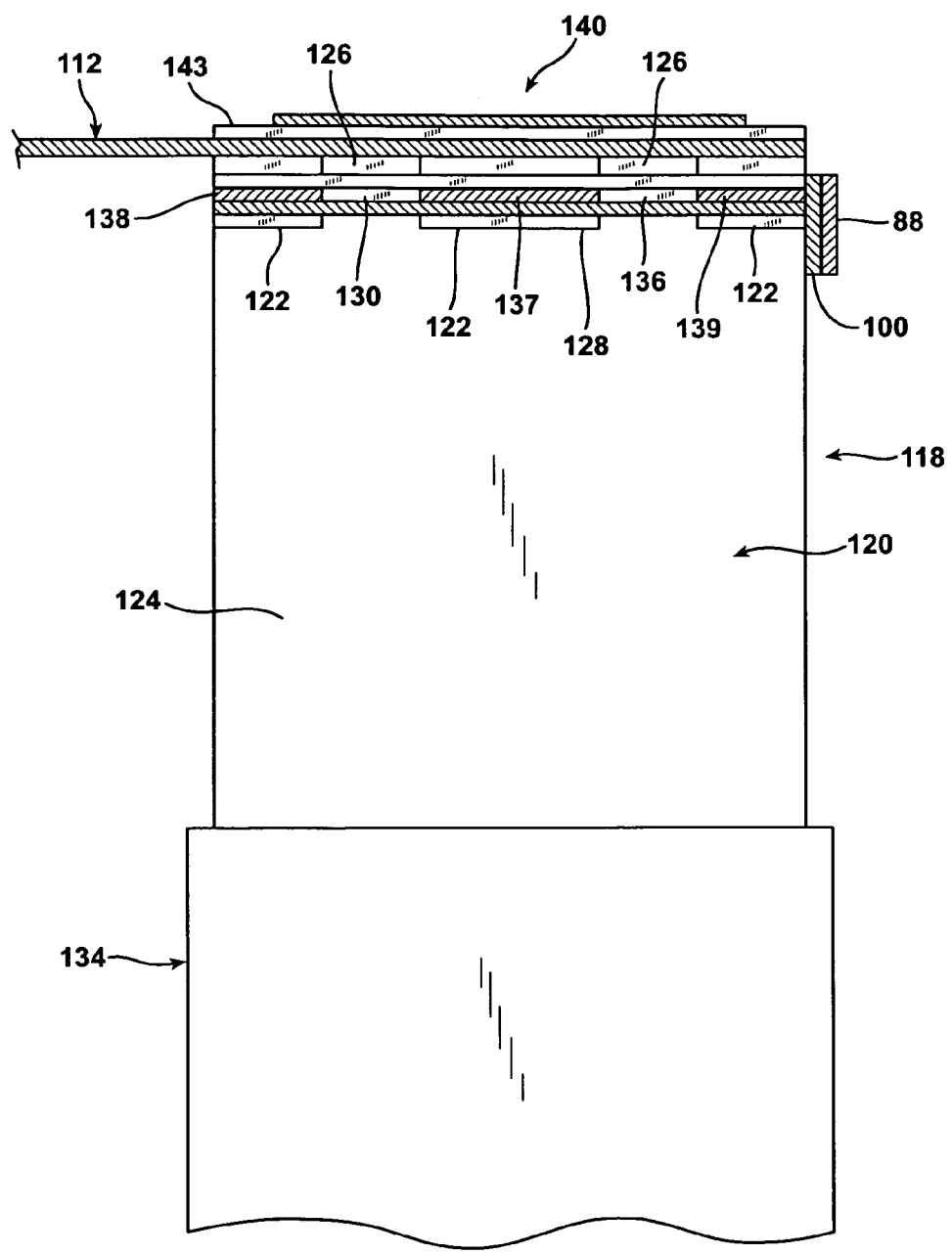
FIG. 18 is a side sectional detail taken along the lines 18—18 of FIG. 15.
Figure 19:
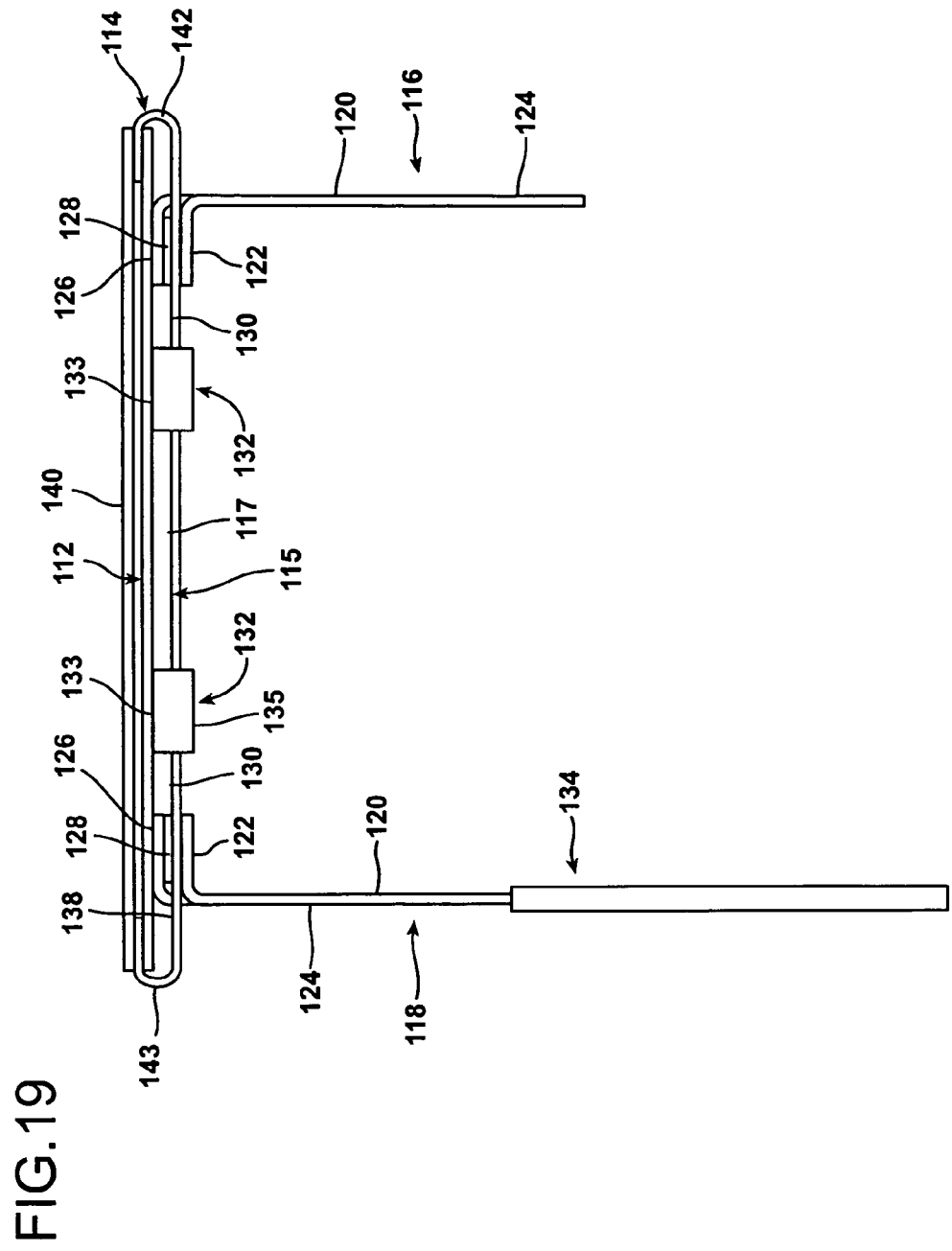
FIG. 19 is a front elevational view of the glare shield of FIG. 15.

Unlike the outboard side panel flap 86 in the glare shield 80, the outboard side flap 118 of the glare shield 110 is adjustable in length. The outboard side flap 118 is comprised of an upper sheet 120 that forms an upper shade panel 124. The upper margin of the upper sheet 120 is folded over into an L-shaped configuration to delineate a narrow, upper shelf 122 from the more expansive shade panel 124. A pair of guide fingers 126 are delineated by laterally extending cuts from the shelf 122, as illustrated in FIG. 17, and project upwardly a short distance and are folded over into an orientation parallel to the plane of the shelf 122, as illustrated in FIG. 19. A fore and aft stabilizing strip 128 is adhesively secured to the undersides of the guide fingers 126. The stabilizing strip 128 resides in a generally parallel orientation relative to the upper shelf 122 in spaced displacement thereabove.

A flat panel 130 is adhesively secured to the upper surfaces of the shelf 122 and projects in a horizontal, inboard direction. A retaining band 132 is located at the inboard extremity of the panel 130 and extends in fore and aft alignment in a flattened loop about the inboard extremity of the panel 130. The inside surface of the upwardly facing lower loop portion 135 of the band 132 is adhesively secured to the underside of the inboard extremity of the panel 130, thereby leaving a narrow gap between the upper surface of the panel 130 and the undersurface of the upper portion 133 of the band 132.

The outboard side flap 118 is also comprised of a side flap extension sleeve 134 that is disposed in telescopic relationship relative to the shade panel 124. The outboard side flap extension sleeve 134 may be moved vertically upwardly into abutment against the underside of the shelf 122, or downward to extend the length of the outboard side flap 118 beyond the lower extremity of the shade panel 124. The inboard side flap 116 is constructed as the mirror image of the outboard side flap 118, except that it does not require the extension sleeve 134. Otherwise the inboard side flap 116 is identical in construction to and includes all of the same elements as the outboard side flap 118, oriented in mirror image relative thereto.

The coupling rack 114 is formed of two components, namely a frame 115 and a retainer strap 140. The frame 115 is formed of a rectangular sheet of stiff, but resilient card stock or plastic and is folded at both of its laterally separated inboard and outboard ends to form a pair of channels 142 and 143 that face each other across the width of the floor 117 of the frame 115. The retainer strap 140 is attached to the upper sides of the channels 142 and 143. Between the channels 142 and 143 the floor 117 of the frame 115 is divided by a pair of laterally extending slots 136 that extend in an inboard and outboard direction to define a center slat 137, a forward end slat 138, and a rearward end slat 139.

During the assembly of the component parts of the adjustable glare shield 110, the guide fingers 126 of the side flaps 116 and 118 are inserted upwardly through the pair of parallel slots 136 defined in the floor 117 of the frame 115 of the coupling rack 114. The guide fingers 126 are inserted through the slots 136 prior to securing the stabilizing strips 128 to the undersides of the guide fingers 126 and prior to securing the retainer strap 140 to the tops of the channels 142 and 143 across the top of the frame 115.

The ends of the retainer strap 140 of the coupling rack 114 are adhesively secured to the turned over ends of the frame 115 that form the channels 142 and 143 at the opposing inboard and outboard ends of the coupling rack 114. The structures of the strips forming the loops 132 are first threaded through the interstitial gap defined between the upper surface of the floor 117 of the frame 115 and the undersurface of the retaining strap 140. Both ends of these strips are then attached to the undersides of the extremities of the panels 130 to form the closed bands 132. The upper portions 133 and the lower portions 135 of the loops 132 thereby reside, respectively, above and beneath the front and rear slats 138 and 139 and the central slat 137 of the coupling rack 114.

As illustrated in the drawings, the guide fingers 126 of the outboard side flap 118 may be alternatively moved in an inboard direction and in an outboard direction, sliding within the slots 136 on either side of the center slat 137 of the floor 117 of the coupling rack 114. The band 132 of the outboard side flap 118 that captures the slats 138 and 139 ensures that movement of the guide fingers 126 is parallel to the alignment of the slots 136. Since the inboard side flap 116 is of a mirror image construction to the outboard side flap 118, with the exception of the extension sleeve 134, it cooperates with the guide structure 114 in the same manner as the outboard side flap 118.

The slats 137, 138, and 139 of the coupling rack frame 115 serve as constraints on either side of the slots 136 to constrain movement of the inboard side flap 116 and the outboard side flap 118 so that those side flaps may be moved closer to or further from each other. The photographer uses his or her fingers to push the side flaps 116 and 118 closer together or further apart, depending upon the width of the LCD screen panel 18. The guide fingers 126 travel within the confines of the slots 136 to hold both the inboard side flap 116 and the outboard side flap 118 in a mutually parallel relationship and perpendicular to both the face of the LCD screen panel 18 and the roof panel 112.

The edge of the slat 139 of the coupling rack 114 resides in abutment against the upper edge of the LCD screen panel 18. It can be seen that the glare shield 110 is thereby completely adjustable to any width and can thereby be mounted upon virtually any size LCD screen 18' employed on commercially available camcorders 14.

As is evident in FIG. 19, the inboard side flap 116 and the outboard side flap 118 may be moved toward and away from each other in inboard and outboard directions to adjust the separation between the upright panels 120 to conform to the width of the LCD screen 18. Also, the length of the outboard side flap 118 may be adjusted by sliding the telescoping extension 134 along the panel 120 either toward or away from the coupling rack 114. The roof 112 of the adjustable glare shield 110 may be moved in longitudinally reciprocal fashion in a fore and aft direction within the confines of the inboard channel 142 and the outboard channel 143 of the coupling rack 114.

Like the roof 82 of the glare shield 80, the roof 112 is equipped with a mounting strip 88 to which a magnetic layer 100 is secured. Slits 96 and 98 separate the ends of the mounting strip 88 from the flat, horizontal structure of the roof 112 to allow the ends of the mounting strip 88 to conform to different convex curvatures of the rear surfaces 102 of different LCD screen panels 18.

The roof panel 112 extends over the top of the frame of the LCD screen 18 so that the fastening strip 88 resides in contact with the rear surface 102 of the LCD screen and is secured thereto by the magnetic strips 100 and 104, as in the embodiment of FIGS. 9–13. The slits 98 between the roof panel 112 and the fastening strip 88 allow the fastening strip 88 to conform to any curvature on the rear surface 102 of an LCD screen 18.

Due to the adjustment mechanisms provided, the glare shield 110 is extremely versatile and may be utilized with any number of different LCD screens 18'. It is therefore unnecessary to provide different size glare shields 110 since the capability of lateral adjustment of the separation between the side flaps 116 and 118 allows the glare shield 110 to be utilized with virtually any size commercially available LCD screen 18'.

Despite the slits in the adjustment features, however, the glare shield 110 is also completely collapsible, just like the other embodiments of the glare shield of the invention. To flatten the glare shield 110, the extension 134 on the outboard side flap is moved all the way upwardly along the upper shade panel 124 to the shelf 122. The inboard side flap 116 and the outboard side flap 118 are then folded at the demarcations between the shade panels 124 and the shelves 122 upwardly toward the coupling rack 114, one against the other. The attachment strip 88 is then flattened into coplanar relationship with the roof panel 112. The glare shield 110 may thereby be stored in a compact, flattened condition and conveniently carried in a pocket or camera bag.

Figure 20:
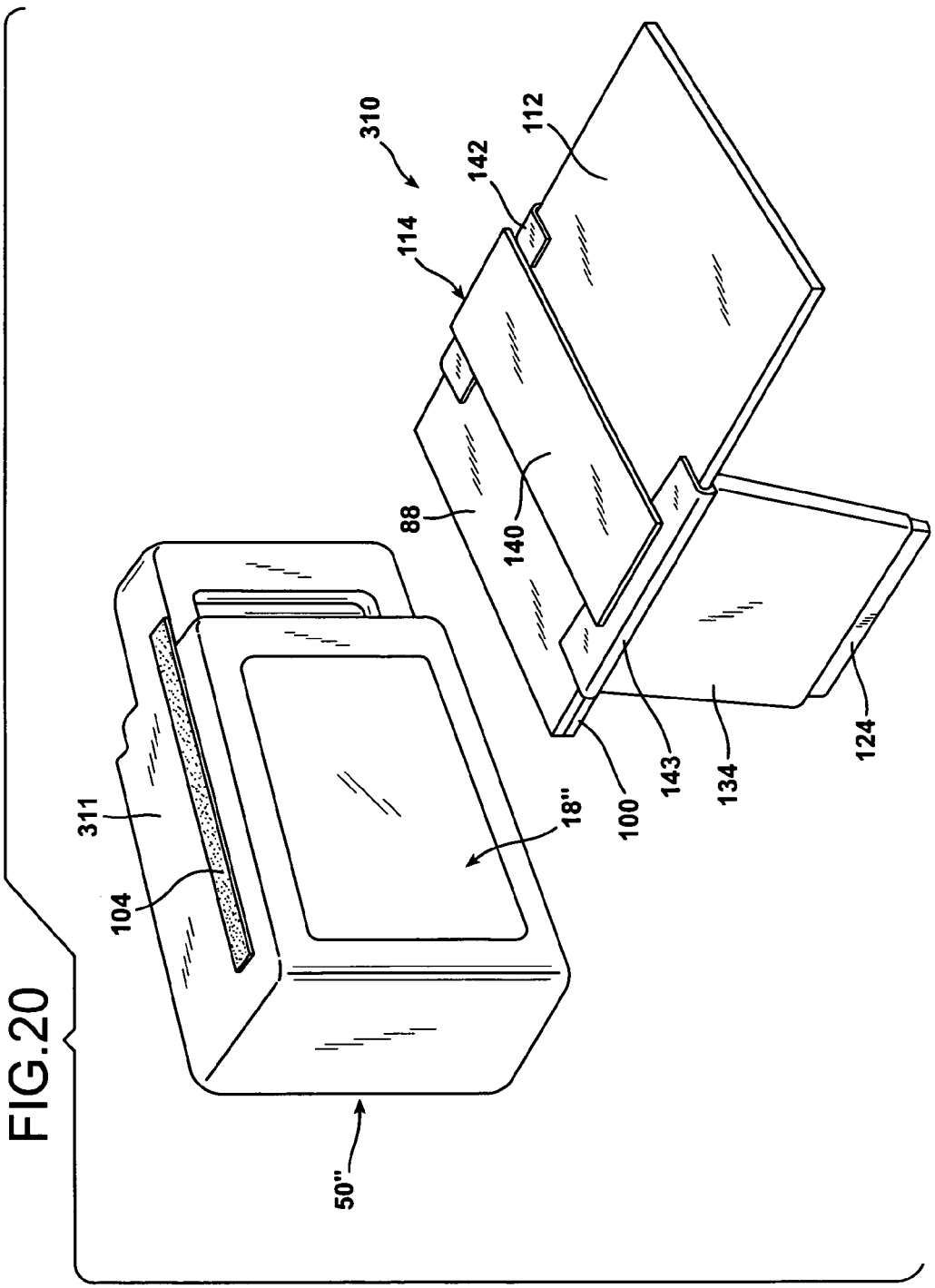
FIG. 20 illustrates the glare shield of FIG. 15 employed on a different type of camera.

A similar glare shield 310 may also be utilized on cameras in which the LCD screen is located on the back of a camera, as illustrated in FIG. 20. As shown in that drawing figure, a digital camera 50" is provided with an LCD screen 18". A laterally oriented magnetic strip 104 is attached by adhesive to the top surface 311 of the camera 50" directly above the LCD screen 18". The mounting strip 88 of the glare shield 310 projects forwardly and in substantially coplanar relationship with the roof 112. The magnetic strip 100 on the underside of the mounting strip 88 is pressed against the magnetic strip 104 above the LCD screen 18". The glare shield 310 is thereby held on the camera 50" to shade the LCD screen 18" by means of the magnetic attraction between the magnetic strips 100 and 104. In this arrangement the roof 112 is pushed along the channels 142 and 143 until the rear edges of the side flaps 116 and 118 remote from the user are flush against the surface of the camera 50" on either side of the LCD screen 18" and in coplanar relationship with the fold 94 between the mounting strip 88 and the roof 112.

Undoubtedly, numerous variations and modifications of the invention will become readily apparent to those familiar with cameras and video camera accessories. Accordingly, the scope of the invention should not be construed as limited to the specific embodiments depicted and described, as other comparable embodiments are also considered to be within the scope of the invention.

We claim:

1. In combination, a camcorder having a video screen panel hinged at one edge and which folds into a seating cavity in said cavity in said camcorder, wherein said video screen panel has front and rear surfaces with a video display screen on its front surface, and a light shield formed as a collapsible structure comprising a flat roof having mutually opposing front and rear edges and mutually opposing inboard and outboard side edges, inboard and outboard side panel flaps, each having a free end and an opposite hinged end and said hinged ends of said inboard and outboard side panel flaps are respectively joined to said inboard and outboard side edges of said roof and each of said side panels flaps is foldable onto said roof into a collapsed condition and unfoldable to a deployed condition extending downwardly from said roof, whereby said side panels reside in contact with said front surface of said video screen panel alongside said video display screen, and further comprising a flat mounting strip extending from said rear edge of said roof rearwardly beyond said side panel flaps and across the entire distance between said side panels flaps, and a single thin, narrow, elongated fastening layer of pressure sensitive adhesive extending the entire length of said mounting strip and joining said mounting strip directly to said video screen panel along a single, fixed, elongated region of attachment at a location on said video screen panel rearwardly from said video display screen and across the entire width thereof.

2. A combination according to claim 1 wherein said inboard and outboard side panel flaps have rear edges which are provided with soft rear edge liners.

3. A combination according to claim 1 wherein said inboard and outboard side panel flaps are mounted to said roof by an adjustable coupling mechanism that permits said inboard side panel flap to be moved in an outboard direction from said inboard side edge of said roof and said outboard side panel flap to be moved in an inboard direction from said outboard side edge of said roof, whereby separation between said inboard and said outboard side panel flaps is selectively adjustable.

4. A combination according to claim 1 wherein said thin, narrow, elongated fastening layer is comprised of a flat double sided adhesive strip.

5. A combination according to claim 1 wherein said outboard side panel flap is provided with an outboard side panel extension.

6. A combination according to claim 5 wherein said outboard side panel extension and said outboard side panel flap are joined together in telescopic fashion.

7. A combination according to claim 1 wherein said the mounting strip is joined to said rear edge of said roof by an interior mounting strip fold that terminates at spaced distances from said inboard and outboard side edges of said roof, and narrow slits are defined between said roof and said fastening strip from said inboard and outboard side edges of said roof to said interior mounting strip fold.

8. In combination, a video camera having a camera body with a video screen panel cavity defined therein, a video screen panel partially formed of a material attracted by magnetism and having front and rear surfaces with a video display screen on said front surface, hinged to said camera body to fold into a stored position nested within said video screen panel cavity and alternatively foldable to a deployed position projecting out from said video screen panel cavity and laterally from said camera body, and a light shield formed as a collapsible structure comprising a flat roof having mutually opposing front and rear edges and mutually opposing inboard and outboard side edges, an outboard side panel flap joined to said outboard side edge of said roof and foldable onto said roof into a collapsed condition and unfoldable to a deployed condition extending downwardly from said roof alongside said video screen displays and in contact with said front surface of said video screen panel outboard from said video screen display when said video screen is in said deployed position, an inboard side panel flap joined to said inboard side edge of said roof and said inboard side panel flap is unfoldable to a deployed condition extending downwardly from said roof and in contact with said front surface of said video screen panel inboard from said video display screen when said video screen panel is in said deployed position, and said inboard and said outboard side panel flaps are both collapsible onto said roof, a flat mounting strip extending rearwardly beyond said side panel flaps and the entire distance between said side panel flaps, and a single, narrow, elongated thin fastening mechanism formed of a magnetized material that magnetically adheres to said video screen panel along a single, fixed, elongated region of attachment, thereby joining said mounting strip to said video screen panel at a location rearwardly from said video display screen and across the entire width thereof.

9. A combination according to claim 8 wherein said video screen panel has an upper edge surface formed of a material attracted by magnetism and said fastening mechanism is attached to said upper edge surface.

10. A combination according to claim 8 wherein said video screen panel has a top edge surface and said rear edge of said roof resides in contact with said top edge surface and said mounting strip is joined to said rear edge of said roof by a mounting strip fold that terminates interiorly from said roof inboard and outboard side edges at spaced distances of separation therefrom, and narrow slits are delineated between said mounting strip and said roof between said inboard and outboard side edges of said roof and said interior mounting strip fold.

11. A combination according to claim 8 wherein said light shield is fabricated from stiff black paper.

12. A combination according to claim 8 wherein said light shield is fabricated from stiff plastic.

* * * * *